US010508903B2

(12) United States Patent
Umemura et al.

(10) Patent No.: US 10,508,903 B2
(45) Date of Patent: Dec. 17, 2019

(54) THREE-DIMENSIONAL MEASUREMENT DEVICE

(71) Applicant: CKD Corporation, Aichi (JP)

(72) Inventors: Nobuyuki Umemura, Aichi (JP);
Tsuyoshi Ohyama, Aichi (JP);
Norihiko Sakaida, Aichi (JP); Manabu Okuda, Aichi (JP)

(73) Assignee: CKD CORPORATION, Aichi (JP)

( * ) Notice: Subject to any disclaimer, the term of this patent is extended or adjusted under 35 U.S.C. 154(b) by 0 days.

(21) Appl. No.: 16/014,515

(22) Filed: Jun. 21, 2018

(65) Prior Publication Data

US 2018/0313645 A1    Nov. 1, 2018

Related U.S. Application Data

(63) Continuation of application No. PCT/JP2016/066133, filed on Jun. 1, 2016.

(30) Foreign Application Priority Data

Dec. 22, 2015  (JP) ................................ 2015-249144

(51) Int. Cl.
*G01B 11/25* (2006.01)
*G01B 11/02* (2006.01)
(Continued)

(52) U.S. Cl.
CPC .......... *G01B 11/2527* (2013.01); *G01B 11/02* (2013.01); *G06T 7/521* (2017.01); *G06T 7/55* (2017.01)

(58) Field of Classification Search
CPC . G01B 11/0608; G01B 11/2441; G01B 11/25; G01B 11/254; G01B 11/2527; G01B 11/02; G06T 7/55; G06T 7/0051
See application file for complete search history.

(56) References Cited

U.S. PATENT DOCUMENTS 4,794,550 A * 12/1988 Greivenkamp, Jr. ....................... G01B 11/254
250/550
5,381,236 A * 1/1995 Morgan ............... G01B 11/026
250/201.7

(Continued)

FOREIGN PATENT DOCUMENTS

| JP | 2002-81923 A | 3/2002 |
| JP | 2007-85862 A | 4/2007 |
| JP | 2007-113958 A | 5/2007 |

OTHER PUBLICATIONS

International Search Report issued in corresponding International Application No. PCT/JP2016/066133 dated Aug. 16, 2016 (3 pages).

*Primary Examiner* — Sang H Nguyen
(74) *Attorney, Agent, or Firm* — Osha Liang LLP

(57) ABSTRACT

A three-dimensional measurement device includes: a projector including: a light source that emits a predetermined light; a grid that converts the light from the light source into a predetermined striped pattern; and a driver that moves the grid, and the projector projecting the striped pattern onto a measurement object; an imaging device that takes an image of the measurement object on which the striped pattern is projected; and a controller that: controls the projector and the imaging device to obtain a plurality of image data having different light intensity distributions; executes three-dimensional measurement of the measurement object by phase shifting based on the image data having different light intensity distributions; and obtains each of the image data among the image data having different light intensity distributions.

17 Claims, 24 Drawing Sheets

(51) Int. Cl.
     *G06T 7/55*     (2017.01)
     *G06T 7/521*    (2017.01)

(56)                References Cited

U.S. PATENT DOCUMENTS

| | | | | |
|---|---|---|---|---|
| 6,144,453 | A * | 11/2000 | Hallerman | G01N 21/88 |
| | | | | 356/616 |
| 7,286,246 | B2 * | 10/2007 | Yoshida | G01B 11/2527 |
| | | | | 250/559.22 |
| 9,696,137 | B2 * | 7/2017 | Braker | G01B 11/2518 |
| 9,891,043 | B2 * | 2/2018 | Aoki | G01B 11/24 |
| 2002/0054299 | A1 * | 5/2002 | Freifeld | G01B 11/024 |
| | | | | 356/625 |
| 2006/0109482 | A1 * | 5/2006 | Duval | G01B 11/0608 |
| | | | | 356/605 |
| 2007/0206204 | A1 * | 9/2007 | Jia | G01B 11/2527 |
| | | | | 356/604 |
| 2010/0091302 | A1 * | 4/2010 | Kim | G01B 11/2531 |
| | | | | 356/603 |
| 2011/0301744 | A1 * | 12/2011 | Ichimaru | B25J 9/1687 |
| | | | | 700/214 |
| 2015/0260509 | A1 * | 9/2015 | Kofman | G01B 11/2504 |
| | | | | 356/601 |
| 2015/0268035 | A1 * | 9/2015 | Furihata | G01B 11/14 |
| | | | | 348/136 |
| 2017/0277028 | A1 * | 9/2017 | Short | G03B 17/54 |

* cited by examiner

FIG. 5

| | X1 →COORDINATES OF PIXELS | X2 | X3 | X4 | X5 | X6 | X7 | X8 | X9 | X10 | X11 | X12 |
|---|---|---|---|---|---|---|---|---|---|---|---|---|
| t-8 | 0.666667 | 1 | 1 | 1 | 1 | 1 | 1 | 1 | 1 | 1 | 1 | 1 |
| t-7 | 0.333333 | 0.666667 | 1 | 1 | 1 | 1 | 1 | 1 | 1 | 1 | 1 | 1 |
| t-6 | 0 | 0.333333 | 0.666667 | 1 | 1 | 1 | 1 | 1 | 1 | 1 | 1 | 1 |
| t-5 | 0 | 0 | 0.333333 | 0.666667 | 1 | 1 | 1 | 1 | 1 | 1 | 1 | 1 |
| t-4 | 0 | 0 | 0 | 0.333333 | 0.666667 | 1 | 1 | 1 | 1 | 1 | 1 | 1 |
| t-3 | 0 | 0 | 0 | 0 | 0.333333 | 0.666667 | 1 | 1 | 1 | 1 | 1 | 1 |
| t-2 | 0 | 0 | 0 | 0 | 0 | 0.333333 | 0.666667 | 1 | 1 | 1 | 1 | 1 |
| t-1 | 0 | 0 | 0 | 0 | 0 | 0 | 0.333333 | 0.666667 | 1 | 1 | 1 | 1 |
| t0 | 0 | 0 | 0 | 0 | 0 | 0 | 0 | 0.333333 | 0.666667 | 1 | 1 | 1 |
| t1 | 0 | 0 | 0 | 0 | 0 | 0 | 0 | 0.333333 | 0.666667 | 1 | 1 | 1 |
| t2 | 0 | 0 | 0 | 0 | 0 | 0 | 0 | 0.333333 | 0.666667 | 1 | 1 | 1 |
| t3 | 0 | 0 | 0 | 0 | 0 | 0 | 0 | 0.333333 | 0.666667 | 1 | 1 | 1 |
| t4 | 0 | 0 | 0 | 0 | 0 | 0 | 0 | 0.333333 | 0.666667 | 1 | 1 | 1 |

FIG. 6

| | X13 ↑ COORDINATES OF PIXELS | X14 | X15 | X16 | X17 | X18 | X19 | X20 | X21 | X22 | X23 | X24 |
|---|---|---|---|---|---|---|---|---|---|---|---|---|
| t-8 | 1 | 1 | 1 | 1 | 1 | 0.666667 | 0.333333 | 0 | 0 | 0 | 0 | 0 |
| t-7 | 1 | 1 | 1 | 1 | 1 | 1 | 0.666667 | 0.333333 | 0 | 0 | 0 | 0 |
| t-6 | 1 | 1 | 1 | 1 | 1 | 1 | 1 | 0.666667 | 0.333333 | 0 | 0 | 0 |
| t-5 | 1 | 1 | 1 | 1 | 1 | 1 | 1 | 1 | 0.666667 | 0.333333 | 0 | 0 |
| t-4 | 1 | 1 | 1 | 1 | 1 | 1 | 1 | 1 | 1 | 0.666667 | 0.333333 | 0 |
| t-3 | 1 | 1 | 1 | 1 | 1 | 1 | 1 | 1 | 1 | 1 | 0.666667 | 0.333333 |
| t-2 | 1 | 1 | 1 | 1 | 1 | 1 | 1 | 1 | 1 | 1 | 1 | 0.666667 |
| t-1 | 1 | 1 | 1 | 1 | 1 | 1 | 1 | 1 | 1 | 1 | 1 | 1 |
| t0 | 1 | 1 | 1 | 1 | 1 | 1 | 1 | 1 | 1 | 1 | 1 | 1 |
| t1 | 1 | 1 | 1 | 1 | 1 | 1 | 1 | 1 | 1 | 1 | 1 | 1 |
| t2 | 1 | 1 | 1 | 1 | 1 | 1 | 1 | 1 | 1 | 1 | 1 | 1 |
| t3 | 1 | 1 | 1 | 1 | 1 | 1 | 1 | 1 | 1 | 1 | 1 | 1 |
| t4 | 1 | 1 | 1 | 1 | 1 | 1 | 1 | 1 | 1 | 1 | 1 | 1 |

FIG. 7

| | COORDINATES OF PIXELS → X25 | X26 | X27 | X28 | X29 | X30 | X31 | X32 | X33 | X34 | X35 | X36 |
|---|---|---|---|---|---|---|---|---|---|---|---|---|
| t-8 | 0 | 0 | 0 | 0 | 0 | 0 | 0 | 0 | 0 | 0 | 0 | 0.333333 |
| t-7 | 0 | 0 | 0 | 0 | 0 | 0 | 0 | 0 | 0 | 0 | 0 | 0 |
| t-6 | 0 | 0 | 0 | 0 | 0 | 0 | 0 | 0 | 0 | 0 | 0 | 0 |
| t-5 | 0 | 0 | 0 | 0 | 0 | 0 | 0 | 0 | 0 | 0 | 0 | 0 |
| t-4 | 0 | 0 | 0 | 0 | 0 | 0 | 0 | 0 | 0 | 0 | 0 | 0 |
| t-3 | 0 | 0 | 0 | 0 | 0 | 0 | 0 | 0 | 0 | 0 | 0 | 0 |
| t-2 | 0.333333 | 0.333333 | 0 | 0 | 0 | 0 | 0 | 0 | 0 | 0 | 0 | 0 |
| t-1 | 0.666667 | 0.666667 | 0.333333 | 0 | 0 | 0 | 0 | 0 | 0 | 0 | 0 | 0 |
| t0 | 1 | 0.666667 | 0.333333 | 0 | 0 | 0 | 0 | 0 | 0 | 0 | 0 | 0 |
| t1 | 1 | 0.666667 | 0.333333 | 0 | 0 | 0 | 0 | 0 | 0 | 0 | 0 | 0 |
| t2 | 1 | 0.666667 | 0.333333 | 0 | 0 | 0 | 0 | 0 | 0 | 0 | 0 | 0 |
| t3 | 1 | 0.666667 | 0.333333 | 0 | 0 | 0 | 0 | 0 | 0 | 0 | 0 | 0 |
| t4 | 1 | 0.666667 | 0.333333 | 0 | 0 | 0 | 0 | 0 | 0 | 0 | 0 | 0 |

FIG. 8A

| | COORDINATES OF PIXELS → | X1 | X2 | X3 | X4 | X5 | X6 | X7 | X8 | X9 | X10 |
|---|---|---|---|---|---|---|---|---|---|---|---|
| IDEAL SINUSOIDAL WAVE: A | t(-3~1) | 0.054497 | 0.100682 | 0.159001 | 0.22768 | 0.304634 | 0.387524 | 0.473832 | 0.560935 | 0.646186 | 0.726995 |
| | t(-2~2) | 0.03321 | 0.071416 | 0.122645 | 0.18534 | 0.257595 | 0.337216 | 0.421783 | 0.508726 | 0.595404 | 0.679184 |
| | t(-1~3) | 0.021848 | 0.054497 | 0.100682 | 0.159001 | 0.22768 | 0.304634 | 0.387524 | 0.473832 | 0.560935 | 0.646186 |
| | t(0~4) | 0.017037 | 0.046846 | 0.090424 | 0.146447 | 0.213212 | 0.288691 | 0.37059 | 0.456422 | 0.543578 | 0.62941 |

FIG. 8B

| | COORDINATES OF PIXELS → | X1 | X2 | X3 | X4 | X5 | X6 | X7 | X8 | X9 | X10 |
|---|---|---|---|---|---|---|---|---|---|---|---|
| RESULTS OF IMAGING (LUMINANCE VALUES): B | t(-3~1) | 0 | 0 | 0 | 0 | 0 | 0.2 | 0.4 | 0.666667 | 0.866667 | 1 |
| | t(-2~2) | 0 | 0 | 0 | 0 | 0.066667 | 0.066667 | 0.2 | 0.533333 | 0.8 | 1 |
| | t(-1~3) | 0 | 0 | 0 | 0 | 0 | 0 | 0.066667 | 0.4 | 0.733333 | 1 |
| | t(0~4) | 0 | 0 | 0 | 0 | 0 | 0 | 0 | 0.333333 | 0.666667 | 1 |

FIG. 8C

| | COORDINATES OF PIXELS → | X1 | X2 | X3 | X4 | X5 | X6 | X7 | X8 | X9 | X10 |
|---|---|---|---|---|---|---|---|---|---|---|---|
| DIFFERENCES FROM IDEAL VALUES (\|A−B\|) | t(-3~1) | 0.054497 | 0.100682 | 0.159001 | 0.22768 | 0.237968 | 0.187524 | 0.073832 | 0.105732 | 0.220481 | 0.273005 |
| | t(-2~2) | 0.03321 | 0.071416 | 0.122645 | 0.18534 | 0.257595 | 0.270549 | 0.221783 | 0.024607 | 0.204596 | 0.320816 |
| | t(-1~3) | 0.021848 | 0.054497 | 0.100682 | 0.159001 | 0.22768 | 0.304634 | 0.320858 | 0.073832 | 0.172399 | 0.353814 |
| | t(0~4) | 0.017037 | 0.046846 | 0.090424 | 0.146447 | 0.213212 | 0.288691 | 0.37059 | 0.123089 | 0.123089 | 0.37059 |

FIG. 9A

IDEAL SINUSOIDAL WAVE: A

| COORDINATES OF PIXELS → | X11 | X12 | X13 | X14 | X15 | X16 | X17 | X18 | X19 | X20 |
|---|---|---|---|---|---|---|---|---|---|---|
| t(-3~1) | 0.800908 | 0.865677 | 0.919335 | 0.960252 | 0.987185 | 0.999315 | 0.996273 | 0.978152 | 0.945503 | 0.899318 |
| t(-2~2) | 0.757519 | 0.82803 | 0.888573 | 0.93731 | 0.972759 | 0.993844 | 0.999924 | 0.990814 | 0.96679 | 0.928584 |
| t(-1~3) | 0.726995 | 0.800908 | 0.865677 | 0.919335 | 0.960252 | 0.987185 | 0.999315 | 0.996273 | 0.978152 | 0.945503 |
| t(0~4) | 0.711309 | 0.786788 | 0.853553 | 0.909576 | 0.953154 | 0.982963 | 0.998097 | 0.998097 | 0.982963 | 0.953154 |

FIG. 9B

RESULTS OF IMAGING (LUMINANCE VALUES): B

| COORDINATES OF PIXELS → | X11 | X12 | X13 | X14 | X15 | X16 | X17 | X18 | X19 | X20 |
|---|---|---|---|---|---|---|---|---|---|---|
| t(-3~1) | 1 | 1 | 1 | 1 | 1 | 1 | 1 | 1 | 1 | 1 |
| t(-2~2) | 1 | 1 | 1 | 1 | 1 | 1 | 1 | 1 | 1 | 1 |
| t(-1~3) | 1 | 1 | 1 | 1 | 1 | 1 | 1 | 1 | 1 | 1 |
| t(0~4) | 1 | 1 | 1 | 1 | 1 | 1 | 1 | 1 | 1 | 1 |

FIG. 9C

DIFFERENCES FROM IDEAL VALUES (|A−B|)

| COORDINATES OF PIXELS → | X11 | X12 | X13 | X14 | X15 | X16 | X17 | X18 | X19 | X20 |
|---|---|---|---|---|---|---|---|---|---|---|
| t(-3~1) | 0.199092 | 0.134323 | 0.080665 | 0.039748 | 0.012815 | 0.000685 | 0.003727 | 0.021848 | 0.054497 | 0.100682 |
| t(-2~2) | 0.242481 | 0.17197 | 0.111427 | 0.06269 | 0.027241 | 0.006156 | 0.000076 | 0.009186 | 0.03321 | 0.071416 |
| t(-1~3) | 0.273005 | 0.199092 | 0.134323 | 0.080665 | 0.039748 | 0.012815 | 0.000685 | 0.003727 | 0.021848 | 0.054497 |
| t(0~4) | 0.288691 | 0.213212 | 0.146447 | 0.090424 | 0.046846 | 0.017037 | 0.001903 | 0.001903 | 0.017037 | 0.046846 |

FIG. 10A

| | COORDINATES OF PIXELS → X21 | X22 | X23 | X24 | X25 | X26 | X27 | X28 | X29 | X30 |
|---|---|---|---|---|---|---|---|---|---|---|
| IDEAL SINUSOIDAL WAVE: A | t(-3~1) | 0.840999 | 0.77232 | 0.695366 | 0.612476 | 0.526168 | 0.439065 | 0.353814 | 0.273005 | 0.199092 | 0.134323 |
| | t(-2~2) | 0.877355 | 0.81466 | 0.742405 | 0.662784 | 0.578217 | 0.491274 | 0.404596 | 0.320816 | 0.242481 | 0.17197 |
| | t(-1~3) | 0.899318 | 0.840999 | 0.77232 | 0.695366 | 0.612476 | 0.526168 | 0.439065 | 0.353814 | 0.273005 | 0.199092 |
| | t(0~4) | 0.909576 | 0.853553 | 0.786788 | 0.711309 | 0.62941 | 0.543578 | 0.456422 | 0.37059 | 0.288691 | 0.213212 |

FIG. 10B

| | COORDINATES OF PIXELS → X21 | X22 | X23 | X24 | X25 | X26 | X27 | X28 | X29 | X30 |
|---|---|---|---|---|---|---|---|---|---|---|
| RESULTS OF IMAGING (LUMINANCE VALUES): B | t(-3~1) | 1 | 1 | 0.933333 | 0.8 | 0.6 | 0.333333 | 0.133333 | 0 | 0 | 0 |
| | t(-2~2) | 1 | 1 | 1 | 0.933333 | 0.8 | 0.466667 | 0.2 | 0 | 0 | 0 |
| | t(-1~3) | 1 | 1 | 1 | 1 | 0.933333 | 0.6 | 0.266667 | 0 | 0 | 0 |
| | t(0~4) | 1 | 1 | 1 | 1 | 1 | 0.666667 | 0.333333 | 0 | 0 | 0 |

FIG. 10C

| | COORDINATES OF PIXELS → X21 | X22 | X23 | X24 | X25 | X26 | X27 | X28 | X29 | X30 |
|---|---|---|---|---|---|---|---|---|---|---|
| DIFFERENCES FROM IDEAL VALUES (\|A-B\|) | t(-3~1) | 0.159001 | 0.22768 | 0.237968 | 0.187524 | 0.073832 | 0.105732 | 0.220481 | 0.273005 | 0.199092 | 0.134323 |
| | t(-2~2) | 0.122645 | 0.18534 | 0.257595 | 0.270549 | 0.221783 | 0.024607 | 0.204596 | 0.320816 | 0.242481 | 0.17197 |
| | t(-1~3) | 0.100682 | 0.159001 | 0.22768 | 0.304634 | 0.320858 | 0.073832 | 0.172399 | 0.353814 | 0.273005 | 0.199092 |
| | t(0~4) | 0.090424 | 0.146447 | 0.213212 | 0.288691 | 0.37059 | 0.123089 | 0.123089 | 0.37059 | 0.288691 | 0.213212 |

FIG. 11A

| | | X31 | X32 | X33 | X34 | X35 | X36 |
|---|---|---|---|---|---|---|---|
| | → COORDINATES OF PIXELS | | | | | | |
| IDEAL SINUSOIDAL WAVE: A | t(-3~1) | 0.080665 | 0.039748 | 0.012815 | 0.000685 | 0.003727 | 0.021848 |
| | t(-2~2) | 0.111427 | 0.06269 | 0.027241 | 0.006156 | 0.000076 | 0.009186 |
| | t(-1~3) | 0.134323 | 0.080665 | 0.039748 | 0.012815 | 0.000685 | 0.003727 |
| | t(0~4) | 0.146447 | 0.090424 | 0.046846 | 0.017037 | 0.001903 | 0.001903 |

FIG. 11B

| | | X31 | X32 | X33 | X34 | X35 | X36 |
|---|---|---|---|---|---|---|---|
| | → COORDINATES OF PIXELS | | | | | | |
| RESULTS OF IMAGING (LUMINANCE VALUES): B | t(-3~1) | 0 | 0 | 0 | 0 | 0 | 0 |
| | t(-2~2) | 0 | 0 | 0 | 0 | 0 | 0 |
| | t(-1~3) | 0 | 0 | 0 | 0 | 0 | 0 |
| | t(0~4) | 0 | 0 | 0 | 0 | 0 | 0 |

FIG. 11C

| | | X31 | X32 | X33 | X34 | X35 | X36 | AVERAGE | MAXIMUM |
|---|---|---|---|---|---|---|---|---|---|
| | → COORDINATES OF PIXELS | | | | | | | | |
| DIFFERENCES FROM IDEAL VALUES (\|A-B\|) | t(-3~1) | 0.080665 | 0.039748 | 0.012815 | 0.000685 | 0.003727 | 0.021848 | 0.118517 | 0.273005 |
| | t(-2~2) | 0.111427 | 0.06269 | 0.027241 | 0.006156 | 0.000076 | 0.009186 | 0.13021 | 0.320816 |
| | t(-1~3) | 0.134323 | 0.080665 | 0.039748 | 0.012815 | 0.000685 | 0.003727 | 0.140739 | 0.353814 |
| | t(0~4) | 0.146447 | 0.090424 | 0.046846 | 0.017037 | 0.001903 | 0.001903 | 0.144249 | 0.37059 |

FIG. 16

| | X1 COORDINATES OF PIXELS | X2 | X3 | X4 | X5 | X6 | X7 | X8 | X9 | X10 | X11 | X12 |
|---|---|---|---|---|---|---|---|---|---|---|---|---|
| t-8 | 0.538462 | 0.615385 | 0.692308 | 0.769231 | 0.846154 | 0.923077 | 1 | | | | | |
| t-7 | 0.461538 | 0.538462 | 0.615385 | 0.692308 | 0.769231 | 0.846154 | 0.923077 | 1 | | | | |
| t-6 | 0.384615 | 0.461538 | 0.538462 | 0.615385 | 0.692308 | 0.769231 | 0.846154 | 0.923077 | 1 | | | |
| t-5 | 0.307692 | 0.384615 | 0.461538 | 0.538462 | 0.615385 | 0.692308 | 0.769231 | 0.846154 | 0.923077 | 1 | | |
| t-4 | 0.230769 | 0.307692 | 0.384615 | 0.461538 | 0.538462 | 0.615385 | 0.692308 | 0.769231 | 0.846154 | 0.923077 | 1 | |
| t-3 | 0.153846 | 0.230769 | 0.307692 | 0.384615 | 0.461538 | 0.538462 | 0.615385 | 0.692308 | 0.769231 | 0.846154 | 0.923077 | 1 |
| t-2 | 0.076923 | 0.153846 | 0.230769 | 0.307692 | 0.384615 | 0.461538 | 0.538462 | 0.615385 | 0.692308 | 0.769231 | 0.846154 | 0.923077 |
| t-1 | 0 | 0.076923 | 0.153846 | 0.230769 | 0.307692 | 0.384615 | 0.461538 | 0.538462 | 0.615385 | 0.692308 | 0.769231 | 0.846154 |
| t0 | 0 | 0 | 0.076923 | 0.153846 | 0.230769 | 0.307692 | 0.384615 | 0.461538 | 0.538462 | 0.615385 | 0.692308 | 0.769231 |
| t1 | 0 | 0 | 0.076923 | 0.153846 | 0.230769 | 0.307692 | 0.384615 | 0.461538 | 0.538462 | 0.615385 | 0.692308 | 0.769231 |
| t2 | 0 | 0 | 0.076923 | 0.153846 | 0.230769 | 0.307692 | 0.384615 | 0.461538 | 0.538462 | 0.615385 | 0.692308 | 0.769231 |
| t3 | 0 | 0 | 0.076923 | 0.153846 | 0.230769 | 0.307692 | 0.384615 | 0.461538 | 0.538462 | 0.615385 | 0.692308 | 0.769231 |
| t4 | 0 | 0 | 0.076923 | 0.153846 | 0.230769 | 0.307692 | 0.384615 | 0.461538 | 0.538462 | 0.615385 | 0.692308 | 0.769231 |

FIG. 17

|   | X13 | X14 | X15 | X16 | X17 | X18 | X19 | X20 | X21 | X22 | X23 | X24 |
|---|---|---|---|---|---|---|---|---|---|---|---|---|
|   | ← COORDINATES OF PIXELS | | | | | | | | | | | |
| t−8 | 0.923077 | 0.846154 | 0.769231 | 0.692308 | 0.615385 | 0.538462 | 0.461538 | 0.384615 | 0.307692 | 0.230769 | 0.153846 | 0.076923 |
| t−7 | 1 | 0.923077 | 0.846154 | 0.769231 | 0.692308 | 0.615385 | 0.538462 | 0.461538 | 0.384615 | 0.307692 | 0.230769 | 0.153846 |
| t−6 | 1 | 1 | 0.923077 | 0.846154 | 0.769231 | 0.692308 | 0.615385 | 0.538462 | 0.461538 | 0.384615 | 0.307692 | 0.230769 |
| t−5 | 1 | 1 | 1 | 0.923077 | 0.846154 | 0.769231 | 0.692308 | 0.615385 | 0.538462 | 0.461538 | 0.384615 | 0.307692 |
| t−4 | 1 | 1 | 1 | 1 | 0.923077 | 0.846154 | 0.769231 | 0.692308 | 0.615385 | 0.538462 | 0.461538 | 0.384615 |
| t−3 | 1 | 1 | 1 | 1 | 1 | 0.923077 | 0.846154 | 0.769231 | 0.692308 | 0.615385 | 0.538462 | 0.461538 |
| t−2 | 1 | 1 | 1 | 1 | 1 | 1 | 0.923077 | 0.846154 | 0.769231 | 0.692308 | 0.615385 | 0.538462 |
| t−1 | 0.923077 | 1 | 1 | 1 | 1 | 1 | 1 | 0.923077 | 0.846154 | 0.769231 | 0.692308 | 0.615385 |
| t0 | 0.846154 | 0.923077 | 1 | 1 | 1 | 1 | 1 | 1 | 0.923077 | 0.846154 | 0.769231 | 0.692308 |
| t1 | 0.846154 | 0.923077 | 1 | 1 | 1 | 1 | 1 | 1 | 0.923077 | 0.846154 | 0.769231 | 0.692308 |
| t2 | 0.846154 | 0.923077 | 1 | 1 | 1 | 1 | 1 | 1 | 0.923077 | 0.846154 | 0.769231 | 0.692308 |
| t3 | 0.846154 | 0.923077 | 1 | 1 | 1 | 1 | 1 | 1 | 0.923077 | 0.846154 | 0.769231 | 0.692308 |
| t4 | 0.846154 | 0.923077 | 1 | 1 | 1 | 1 | 1 | 1 | 0.923077 | 0.846154 | 0.769231 | 0.692308 |

FIG. 18

| | X25 ↑ COORDINATES OF PIXELS | X26 | X27 | X28 | X29 | X30 | X31 | X32 | X33 | X34 | X35 | X36 |
|---|---|---|---|---|---|---|---|---|---|---|---|---|
| t-8 | 0 | 0 | 0 | 0 | 0 | 0 | 0.076923 | 0.153846 | 0.230769 | 0.307692 | 0.384615 | 0.461538 |
| t-7 | 0.076923 | 0 | 0 | 0 | 0 | 0 | 0 | 0.076923 | 0.153846 | 0.230769 | 0.307692 | 0.384615 |
| t-6 | 0.153846 | 0.076923 | 0 | 0 | 0 | 0 | 0 | 0 | 0.076923 | 0.153846 | 0.230769 | 0.307692 |
| t-5 | 0.230769 | 0.153846 | 0.076923 | 0 | 0 | 0 | 0 | 0 | 0 | 0.076923 | 0.153846 | 0.230769 |
| t-4 | 0.307692 | 0.230769 | 0.153846 | 0.076923 | 0 | 0 | 0 | 0 | 0 | 0 | 0.076923 | 0.153846 |
| t-3 | 0.384615 | 0.307692 | 0.230769 | 0.153846 | 0.076923 | 0 | 0 | 0 | 0 | 0 | 0 | 0.076923 |
| t-2 | 0.461538 | 0.384615 | 0.307692 | 0.230769 | 0.153846 | 0.076923 | 0 | 0 | 0 | 0 | 0 | 0 |
| t-1 | 0.538462 | 0.461538 | 0.384615 | 0.307692 | 0.230769 | 0.153846 | 0.076923 | 0 | 0 | 0 | 0 | 0 |
| t0 | 0.615385 | 0.538462 | 0.461538 | 0.384615 | 0.307692 | 0.230769 | 0.153846 | 0.076923 | 0 | 0 | 0 | 0 |
| t1 | 0.615385 | 0.538462 | 0.461538 | 0.384615 | 0.307692 | 0.230769 | 0.153846 | 0.076923 | 0 | 0 | 0 | 0 |
| t2 | 0.615385 | 0.538462 | 0.461538 | 0.384615 | 0.307692 | 0.230769 | 0.153846 | 0.076923 | 0 | 0 | 0 | 0 |
| t3 | 0.615385 | 0.538462 | 0.461538 | 0.384615 | 0.307692 | 0.230769 | 0.153846 | 0.076923 | 0 | 0 | 0 | 0 |
| t4 | 0.615385 | 0.538462 | 0.461538 | 0.384615 | 0.307692 | 0.230769 | 0.153846 | 0.076923 | 0 | 0 | 0 | 0 |

FIG. 19A

| IDEAL SINUSOIDAL WAVE: A | COORDINATES OF PIXELS → | X1 | X2 | X3 | X4 | X5 | X6 | X7 | X8 | X9 | X10 |
|---|---|---|---|---|---|---|---|---|---|---|---|
| | t(-3~1) | 0.054497 | 0.100682 | 0.159001 | 0.22768 | 0.304634 | 0.387524 | 0.473832 | 0.560935 | 0.646186 | 0.726995 |
| | t(-2~2) | 0.03321 | 0.071416 | 0.122645 | 0.18534 | 0.257595 | 0.337216 | 0.421783 | 0.508726 | 0.595404 | 0.679184 |
| | t(-1~3) | 0.021848 | 0.054497 | 0.100682 | 0.159001 | 0.22768 | 0.304634 | 0.387524 | 0.473832 | 0.560935 | 0.646186 |
| | t(0~4) | 0.017037 | 0.046846 | 0.090424 | 0.146447 | 0.213212 | 0.288691 | 0.37059 | 0.456422 | 0.543578 | 0.62941 |

FIG. 19B

| RESULTS OF IMAGING (LUMINANCE VALUES): B | COORDINATES OF PIXELS → | X1 | X2 | X3 | X4 | X5 | X6 | X7 | X8 | X9 | X10 |
|---|---|---|---|---|---|---|---|---|---|---|---|
| | t(-3~1) | 0.046154 | 0.092308 | 0.169231 | 0.246154 | 0.323077 | 0.4 | 0.476923 | 0.553846 | 0.630769 | 0.707692 |
| | t(-2~2) | 0.015385 | 0.046154 | 0.123077 | 0.2 | 0.276923 | 0.353846 | 0.430769 | 0.507692 | 0.584615 | 0.661538 |
| | t(-1~3) | 0 | 0.015385 | 0.092308 | 0.169231 | 0.246154 | 0.323077 | 0.4 | 0.476923 | 0.553846 | 0.630769 |
| | t(0~4) | 0 | 0 | 0.076923 | 0.153846 | 0.230769 | 0.307692 | 0.384615 | 0.461538 | 0.538462 | 0.615385 |

FIG. 19C

| DIFFERENCES FROM IDEAL VALUES (\|A-B\|) | COORDINATES OF PIXELS → | X1 | X2 | X3 | X4 | X5 | X6 | X7 | X8 | X9 | X10 |
|---|---|---|---|---|---|---|---|---|---|---|---|
| | t(-3~1) | 0.008343 | 0.008375 | 0.01023 | 0.018473 | 0.018442 | 0.012476 | 0.003091 | 0.007089 | 0.015417 | 0.019303 |
| | t(-2~2) | 0.017825 | 0.025263 | 0.000432 | 0.01466 | 0.019328 | 0.01663 | 0.008986 | 0.001034 | 0.010789 | 0.017646 |
| | t(-1~3) | 0.021848 | 0.039112 | 0.008375 | 0.01023 | 0.018473 | 0.018442 | 0.012476 | 0.003091 | 0.007089 | 0.015417 |
| | t(0~4) | 0.017037 | 0.046846 | 0.013501 | 0.0074 | 0.017557 | 0.019001 | 0.014025 | 0.005116 | 0.005116 | 0.014025 |

FIG. 20A

| | COORDINATES OF PIXELS → | X11 | X12 | X13 | X14 | X15 | X16 | X17 | X18 | X19 | X20 |
|---|---|---|---|---|---|---|---|---|---|---|---|
| IDEAL SINUSOIDAL WAVE: A | t(-3~1) | 0.800908 | 0.865677 | 0.919335 | 0.960252 | 0.987185 | 0.999315 | 0.996273 | 0.978152 | 0.945503 | 0.899318 |
| | t(-2~2) | 0.757519 | 0.82803 | 0.888573 | 0.93731 | 0.972759 | 0.993844 | 0.999924 | 0.990814 | 0.96679 | 0.928584 |
| | t(-1~3) | 0.726995 | 0.800908 | 0.865677 | 0.919335 | 0.960252 | 0.987185 | 0.999315 | 0.996273 | 0.978152 | 0.945503 |
| | t(0~4) | 0.711309 | 0.786788 | 0.853553 | 0.909576 | 0.953154 | 0.982963 | 0.998097 | 0.998097 | 0.982963 | 0.953154 |

FIG. 20B

| | COORDINATES OF PIXELS → | X11 | X12 | X13 | X14 | X15 | X16 | X17 | X18 | X19 | X20 |
|---|---|---|---|---|---|---|---|---|---|---|---|
| RESULTS OF IMAGING (LUMINANCE VALUES): B | t(-3~1) | 0.784615 | 0.861538 | 0.923077 | 0.969231 | 1 | 1 | 1 | 0.984615 | 0.953846 | 0.907692 |
| | t(-2~2) | 0.738462 | 0.815385 | 0.892308 | 0.953846 | 1 | 1 | 1 | 1 | 0.984615 | 0.953846 |
| | t(-1~3) | 0.707692 | 0.784615 | 0.861538 | 0.938462 | 1 | 1 | 1 | 1 | 1 | 0.984615 |
| | t(0~4) | 0.692308 | 0.769231 | 0.846154 | 0.923077 | 1 | 1 | 1 | 1 | 1 | 1 |

FIG. 20C

| | COORDINATES OF PIXELS → | X11 | X12 | X13 | X14 | X15 | X16 | X17 | X18 | X19 | X20 |
|---|---|---|---|---|---|---|---|---|---|---|---|
| DIFFERENCES FROM IDEAL VALUES (\|A−B\|) | t(-3~1) | 0.016292 | 0.004138 | 0.003742 | 0.008978 | 0.012815 | 0.000685 | 0.003727 | 0.006463 | 0.008343 | 0.008375 |
| | t(-2~2) | 0.019057 | 0.012645 | 0.003735 | 0.016536 | 0.027241 | 0.006156 | 0.000076 | 0.009186 | 0.017825 | 0.025263 |
| | t(-1~3) | 0.019303 | 0.016292 | 0.004138 | 0.019126 | 0.039748 | 0.012815 | 0.000685 | 0.003727 | 0.021848 | 0.039112 |
| | t(0~4) | 0.019001 | 0.017557 | 0.0074 | 0.013501 | 0.046846 | 0.017037 | 0.001903 | 0.001903 | 0.017037 | 0.046846 |

FIG. 21A

| IDEAL SINUSOIDAL WAVE: A | COORDINATES OF PIXELS → | X21 | X22 | X23 | X24 | X25 | X26 | X27 | X28 | X29 | X30 |
|---|---|---|---|---|---|---|---|---|---|---|---|
| | t(-3~1) | 0.840999 | 0.77232 | 0.695366 | 0.612476 | 0.526168 | 0.439065 | 0.353814 | 0.273005 | 0.199092 | 0.134323 |
| | t(-2~2) | 0.877355 | 0.81466 | 0.742405 | 0.662784 | 0.578217 | 0.491274 | 0.404596 | 0.320816 | 0.242481 | 0.17197 |
| | t(-1~3) | 0.899318 | 0.840999 | 0.77232 | 0.695366 | 0.612476 | 0.526168 | 0.439065 | 0.353814 | 0.273005 | 0.199092 |
| | t(0~4)   | 0.909576 | 0.853553 | 0.786788 | 0.711309 | 0.62941  | 0.543578 | 0.456422 | 0.37059  | 0.288691 | 0.213212 |

FIG. 21B

| RESULTS OF IMAGING (LUMINANCE VALUES): B | COORDINATES OF PIXELS → | X21 | X22 | X23 | X24 | X25 | X26 | X27 | X28 | X29 | X30 |
|---|---|---|---|---|---|---|---|---|---|---|---|
| | t(-3~1) | 0.830769 | 0.753846 | 0.676923 | 0.6 | 0.523077 | 0.446154 | 0.369231 | 0.292308 | 0.215385 | 0.138462 |
| | t(-2~2) | 0.876923 | 0.8 | 0.723077 | 0.646154 | 0.569231 | 0.492308 | 0.415385 | 0.338462 | 0.261538 | 0.184615 |
| | t(-1~3) | 0.907692 | 0.830769 | 0.753846 | 0.676923 | 0.6 | 0.523077 | 0.446154 | 0.369231 | 0.292308 | 0.215385 |
| | t(0~4)   | 0.923077 | 0.846154 | 0.769231 | 0.692308 | 0.615385 | 0.538462 | 0.461538 | 0.384615 | 0.307692 | 0.230769 |

FIG. 21C

| DIFFERENCES FROM IDEAL VALUES (\|A−B\|) | COORDINATES OF PIXELS → | X21 | X22 | X23 | X24 | X25 | X26 | X27 | X28 | X29 | X30 |
|---|---|---|---|---|---|---|---|---|---|---|---|
| | t(-3~1) | 0.01023 | 0.018473 | 0.018442 | 0.012476 | 0.003091 | 0.007089 | 0.015417 | 0.019303 | 0.016292 | 0.004138 |
| | t(-2~2) | 0.000432 | 0.01466 | 0.019328 | 0.01663 | 0.008986 | 0.001034 | 0.010789 | 0.017646 | 0.019057 | 0.012645 |
| | t(-1~3) | 0.008375 | 0.01023 | 0.018473 | 0.018442 | 0.012476 | 0.003091 | 0.007089 | 0.015417 | 0.019303 | 0.016292 |
| | t(0~4)   | 0.013501 | 0.0074 | 0.017557 | 0.019001 | 0.014025 | 0.005116 | 0.005116 | 0.014025 | 0.019001 | 0.017557 |

FIG. 22A

| | | X31 | X32 | X33 | X34 | X35 | X36 |
|---|---|---|---|---|---|---|---|
| | → COORDINATES OF PIXELS | | | | | | |
| IDEAL SINUSOIDAL WAVE:A | t(-3~1) | 0.080665 | 0.039748 | 0.012815 | 0.000685 | 0.003727 | 0.021848 |
| | t(-2~2) | 0.111427 | 0.06269 | 0.027241 | 0.006156 | 0.000076 | 0.009186 |
| | t(-1~3) | 0.134323 | 0.080665 | 0.039748 | 0.012815 | 0.000685 | 0.003727 |
| | t(0~4) | 0.146447 | 0.090424 | 0.046846 | 0.017037 | 0.001903 | 0.001903 |

FIG. 22B

| | | X31 | X32 | X33 | X34 | X35 | X36 |
|---|---|---|---|---|---|---|---|
| | → COORDINATES OF PIXELS | | | | | | |
| RESULTS OF IMAGING (LUMINANCE VALUES):B | t(-3~1) | 0.076923 | 0.030769 | 0 | 0 | 0 | 0.015385 |
| | t(-2~2) | 0.107692 | 0.046154 | 0 | 0 | 0 | 0 |
| | t(-1~3) | 0.138462 | 0.061538 | 0 | 0 | 0 | 0 |
| | t(0~4) | 0.153846 | 0.076923 | 0 | 0 | 0 | 0 |

FIG. 22C

| | | X31 | X32 | X33 | X34 | X35 | X36 | AVERAGE | MAXIMUM |
|---|---|---|---|---|---|---|---|---|---|
| | → COORDINATES OF PIXELS | | | | | | | | |
| DIFFERENCES FROM IDEAL VALUES (\|A−B\|) | t(-3~1) | 0.003742 | 0.008978 | 0.012815 | 0.000685 | 0.003727 | 0.006463 | 0.009893 | 0.019303 |
| | t(-2~2) | 0.003735 | 0.016536 | 0.027241 | 0.006156 | 0.000076 | 0.009186 | 0.012624 | 0.027241 |
| | t(-1~3) | 0.004138 | 0.019126 | 0.039748 | 0.012815 | 0.000685 | 0.003727 | 0.015021 | 0.039748 |
| | t(0~4) | 0.0074 | 0.013501 | 0.046846 | 0.017037 | 0.001903 | 0.001903 | 0.015821 | 0.046846 |

THREE-DIMENSIONAL MEASUREMENT DEVICE

BACKGROUND

Technical Field

The present disclosure relates to a three-dimensional measurement device configured to execute three-dimensional measurement by using a phase shift method.

Description of Related Art

In general, when electronic components are mounted on a printed circuit board, solder paste is printed on a predetermined electrode pattern provided on a printed circuit board. The electronic components are then temporarily fastened on the printed circuit board by means of the viscosity of the solder paste. The printed circuit board is subsequently introduced into a reflow furnace and is subjected to a predetermined reflow process to achieve soldering. Recently there has been a need to inspect the printing condition of solder paste in a stage prior to introduction into the reflow furnace. A three-dimensional measurement device may be used for this inspection.

Various contactless three-dimensional measurement devices using light have been proposed lately. Among them, three-dimensional measurement devices employing the phase shift method are known well.

In a three-dimensional measurement device using the phase shift method, a predetermined striped pattern is projected on a measurement object by a predetermined projection unit. The projection unit includes a light source configured to emit a predetermined light and a grid configured to convert the light from the light source into a striped pattern.

The grid is configured such that light transmitting portions of transmitting light and light shielding portions of shielding light are alternately arranged.

The three-dimensional measurement device then uses an imaging unit placed immediately above the measurement object to take an image of the striped pattern projected on the measurement object. The imaging unit used may be, for example, a CCD camera comprised of a lens, an imaging element and the like.

In the configuration described above, the intensity (luminance) I of light in each pixel on image data taken by a camera is given by Expression (U1) given below:

$$I = f \sin \varphi + e \quad (U1)$$

where f denotes a gain, e denotes an offset and $\varphi$ denotes a phase of a striped pattern.

A related art is configured to intermittently move a grid, shift the phase of a striped pattern, for example, by 90 degrees each to four different phases ($\varphi+0$, $\varphi+90°$, $\varphi+180°$ and $\varphi+270°$), and take an image of the striped pattern every time the grid is at stop as shown in FIG. 28. This provides image data having intensity distributions $I_0$, $I_1$, $I_2$ and $I_3$ taken under the respective striped patterns having different phases and then determines the phase $\varphi$ according to Expression (U2) given below:

$$\varphi = \tan^{-1}[(I_1 - I_3)/(I_2 - I_0)] \quad (U2)$$

A height (Z) at each coordinates (X,Y) on a measurement object can be determined by using this phase $\varphi$, based on the principle of triangulation.

In general, a three-dimensional measurement device using the phase shift method projects a striped pattern having a light intensity distribution in a sinusoidal waveform, with a view to increasing the measurement accuracy. It is, however, very difficult to project a striped pattern having a light intensity distribution in a sinusoidal waveform of a high accuracy.

A recently proposed technique projects a striped pattern having a light intensity distribution in a rectangular waveform that is obtained by conversion via a grid, on a measurement object with defocusing, so as to project this striped pattern as a striped pattern having a light intensity distribution in a sinusoidal waveform (as described in, for example, Patent Literature 1).

CITATION LIST

Patent Literature

PTL 1: JP 2007-85862A

Unlike focusing, it is extremely difficult to maintain and manage the degree of defocusing of a striped pattern in a desired state. This is likely to collapse the light intensity distribution (waveform) of the striped pattern that is projected on the measurement object and fail to provide a light intensity distribution in a sinusoidal waveform.

The degree of defocusing of the striped pattern changes according to the relative positional relationship to the measurement object. A change in relative positional relationship to the measurement object is thus likely to change the light intensity distribution (waveform) of the striped pattern.

Additionally, the out-of-focus projection does not enable a striped pattern to be projected by using a telecentric optical system.

As a result, this is likely to reduce the measurement accuracy in three-dimensional measurement.

The above matter is not characteristic of the height measurement of, for example, the solder paste printed on the printed circuit board but may be commonly found in the field of other three-dimensional measurement devices.

SUMMARY

A three-dimensional measurement device according to one or more embodiments of the present invention dramatically improves the measurement accuracy in three-dimensional measurement by using the phase shift method.

Embodiments of the present invention are described. Functions and advantageous effects according to one or more embodiments of the present invention are also described as appropriate.

A three-dimensional measurement device according to one or more embodiments of the present invention comprises a projection unit arranged to include a light source that emits a predetermined light, a grid that converts the light from the light source into a predetermined striped pattern, and a drive unit that moves the grid, and configured to project the striped pattern onto a measurement object (for example, a printed circuit board); an imaging unit configured to take an image of the measurement object on which the striped pattern is projected; an image acquirer configured to control the projection unit and the imaging unit and obtain a plurality of image data having different light intensity distributions; and an image processor configured to perform three-dimensional measurement of the measurement object by a phase shift method, based on the plurality of image data obtained by the image acquirer. The image acquirer obtains each image data among the plurality of image data by performing a process of moving the grid to a predetermined position and temporarily stopping the grid at the predetermined position; and performing an imaging process that continuously performs imaging (exposure) during a predetermined period including at least a stop period of the grid and part of a moving period of the grid prior to a start of the stop period and/or part of a moving period of the grid after termination of the stop period, or performing an imaging process that performs imaging (exposure) in a plurality of times during a predetermined period including at least a stop period of the grid and part of a moving period of the grid prior to a start of the stop period and/or part of a moving period of the grid after termination of the stop period, and performing a process of summing up or averaging results of the imaging (luminance values of respective pixels in the plurality of taken image data) with regard to each pixel.

According to one or more embodiments of the present invention, the imaging period (predetermined period) includes not only the stop period of the intermittently moving grid but part of the moving period prior to the stop period and/or part of the moving period after the stop period. The configuration according to one or more embodiments of the present invention then continuously performs imaging of the striped pattern during stop or during move in this imaging period or performs imaging in a plurality of times and sums up or averages the imaging results with regard to each pixel. This provides image data partly including data of the striped pattern during move.

As a result, in the process of obtaining each image data among a plurality of image data having different light intensity distributions required for three-dimensional measurement by the phase shift method, this configuration can obtain image data having a light intensity distribution closer to the ideal sinusoidal waveform, compared with a configuration that simply projects a predetermined striped pattern (for example, a striped pattern having a light intensity distribution in a rectangular waveform) and takes an image of the striped pattern only during a stop period.

The "sinusoidal waveform" herein means a "waveform like a sinusoidal wave". The term "sinusoidal waveform" is not limited to an ideal "sinusoidal waveform" but includes a quasi-sinusoidal waveform (the same applies to a "non-sinusoidal waveform" like a "rectangular waveform" described later).

The above "predetermined striped pattern" includes a "striped pattern having a light intensity distribution in a sinusoidal waveform". Accordingly, one or more embodiments of the present invention may be configured to project a striped pattern having a light intensity distribution that is not in an ideal "sinusoidal waveform" but is in a quasi-sinusoidal waveform and obtain image data having a light intensity distribution closer to the ideal sinusoidal waveform.

The configuration according to one or more embodiments of the present invention can obtain image data having a light intensity distribution in a sinusoidal waveform even when projecting the striped pattern in focus. Projecting the striped pattern in focus enables the light intensity distribution (waveform) of the striped pattern to be readily maintained. This also enables a striped pattern to be projected by using a telecentric optical system.

As a result, this configuration dramatically improves the measurement accuracy in three-dimensional measurement by using the phase shift method.

The related art is configured to start an imaging process simultaneously with termination of a moving process of a grid (or after termination of the moving process) and to start a moving process of the grid simultaneously with termination of an imaging process (or after termination of the imaging process) as shown in FIG. 28.

Additionally, moving the grid takes a relatively long time, in order to avoid vibration and the like. There is accordingly a limitation in shortening the moving period of the grid.

One or more embodiments of the present invention are, on the other hand, configured to start an imaging process without waiting for termination of a moving process of the grid and/or to start a moving process of the grid without waiting for termination of an imaging process. This configuration shortens the stop period of the grid and increases the speed of measurement.

With a view to shortening the stop period of the grid, when the imaging period does not include a moving period of the grid prior to a start of a stop period of the grid but includes only part of a moving period of the grid after termination of a stop period, an imaging process is started simultaneously with termination of a moving process of the grid (a start of a stop process of the grid). Similarly, when the imaging period does not include a moving period of the grid after termination of a stop period of the grid but includes only part of a moving period of the grid prior to a start of a stop period, a moving process of the grid is started simultaneously with termination of an imaging process.

In the three-dimensional measurement device according to the aforementioned embodiments, the predetermined period (imaging period) may have a length that is set equal to or shorter than a length of one moving period of the grid (period in which the grid is moved by one phase shift amount).

An increase in ratio of the moving period of the grid included in the imaging period decreases a difference from an ideal sinusoidal waveform. Imaging beyond a period of moving corresponding to a predetermined phase shift amount (for example, a period of moving corresponding to a phase of 90 degrees) is, however, likely to deviate the waveform of a light intensity distribution of image data from the ideal sinusoidal waveform. The configuration according to one or more embodiments of the present invention, on the other hand, suppresses reduction of the measurement accuracy.

In the three-dimensional measurement device according to the aforementioned embodiments, the predetermined striped pattern may be a striped pattern having a light intensity distribution in a non-sinusoidal waveform.

The above "non-sinusoidal waveform" means a predetermined waveform other than the "sinusoidal waveform", for example, a "rectangular waveform", a "trapezoidal waveform", a "triangular waveform" or a "sawtooth waveform".

In general, a configuration that projects a striped pattern having a light intensity distribution in a sinusoidal waveform and performs three-dimensional measurement provides the higher measurement accuracy than a configuration that projects a striped pattern having a light intensity distribution in a non-sinusoidal waveform (for example, in a rectangular waveform) and performs three-dimensional measurement.

It is, however, very difficult to generate the striped pattern having the light intensity distribution in the sinusoidal waveform by the projection unit as described above. This may result in complication of the mechanical configuration.

The configuration according to one or more embodiments of the present invention, however, projects a striped pattern having a light intensity distribution that is not in a sinusoidal waveform but is in a non-sinusoidal waveform (for example, in a rectangular waveform) without complicating the mechanical configuration of the projection unit and obtains image data having a light intensity distribution in a sinusoidal waveform by, for example, the relatively simple control process and arithmetic process. As a result, this suppresses complication of the mechanical configuration and reduces the manufacturing cost.

In the three-dimensional measurement device according to the aforementioned embodiments, the grid may be configured such that light transmitting portions of transmitting light and light shielding portions of shielding light are alternately arranged.

The configuration according to one or more embodiments of the present invention provides similar functions and advantageous effects to those of the configuration according to the aforementioned embodiments. Using the binary grid according to one or more embodiments of the present invention can project a striped pattern having a light intensity distribution including at least a flat peak portion of a maximum and constant luminance (hereinafter referred to as "bright portion") and a flat peak portion of a minimum and constant luminance (hereinafter referred to as "dark portion"). Accordingly, this configuration can project a striped pattern having a light intensity distribution in a rectangular waveform or in a trapezoidal waveform.

The light passing through the grid is generally not a completely parallel light and does not provide a perfect rectangular wave, since intermediate tone ranges are likely to be generated on boundaries between "bright portions" and "dark portions" of the striped pattern due to, for example, diffraction effect on the boundaries between the light transmitting portions and the light shielding portions.

The waveform of the light intensity distribution may differ according to the configuration, for example, the arrangement and intervals of the light transmitting portions and the light shielding portions of the grid. A sharp luminance gradient in the intermediate tone range on the boundary between the "bright portion" and the "dark portion" provides a striped pattern having a light intensity distribution in a rectangular waveform. A gentle luminance gradient in the intermediate tone range, on the other hand, provides a striped pattern having a light intensity distribution in a trapezoidal waveform.

In the three-dimensional measurement device according to the aforementioned embodiments, the measurement object may be a printed circuit board with solder paste printed thereon or a wafer substrate with a solder bump formed thereon.

This configuration according to one or more embodiments of the present invention allows for measurement of the height of, for example, the solder paste printed on the printed circuit board or the solder bump formed on the wafer substrate. This configuration also enables the good/poor quality of the solder paste or the solder bump to be determined, based on the measurement value in inspection of the solder paste or the solder bump. This configuration accordingly ensures the functions and the advantageous effects according to the aforementioned embodiments in this inspection and allows for the good/poor quality determination with high accuracy. This results in improving the inspection accuracy in a solder printing inspection apparatus or in a solder bump inspection apparatus.

BRIEF DESCRIPTION OF DRAWINGS

FIG. 5 is a table showing light intensity distributions in an X-axis direction of an imaging element (coordinates X1 to X12) after elapse of every predetermined time period in a first simulation according to one or more embodiments of the present invention;

FIG. 6 is a table showing the light intensity distributions in the X-axis direction of the imaging element (coordinates X13 to X24) after elapse of every predetermined time period in the first simulation according to one or more embodiments of the present invention;

FIG. 7 is a table showing the light intensity distributions in the X-axis direction of the imaging element (coordinates X25 to X36) after elapse of every predetermined time period in the first simulation according to one or more embodiments of the present invention;

FIGS. 8A-8C are tables relating to the first simulation according to one or more embodiments of the present invention: FIG. 8A is a table showing light intensity distributions in an ideal sinusoidal waveform in the X-axis direction of the imaging element (coordinates X1 to X10); FIG. 8B is a table showing respective average values of luminance values in the respective pixels; and FIG. 8C is a table showing differences between ideal values and the respective average values;

FIGS. 9A-9C are tables relating to the first simulation according to one or more embodiments of the present invention: FIG. 9A is a table showing the light intensity distributions in the ideal sinusoidal waveform in the X-axis direction of the imaging element (coordinates X11 to X20); FIG. 9B is a table showing respective average values of luminance values in the respective pixels; and FIG. 9C is a table showing differences between ideal values and the respective average values;

FIGS. 10A-10C are tables relating to the first simulation according to one or more embodiments of the present invention: FIG. 10A is a table showing the light intensity distributions in the ideal sinusoidal waveform in the X-axis direction of the imaging element (coordinates X21 to X30); FIG. 10B is a table showing respective average values of luminance values in the respective pixels; and FIG. 10C is a table showing differences between ideal values and the respective average values;

FIGS. 11A-11C are tables relating to the first simulation according to one or more embodiments of the present invention: FIG. 11A is a table showing the light intensity distributions in the ideal sinusoidal waveform in the X-axis direction of the imaging element (coordinates X31 to X36); FIG. 11B is a table showing respective average values of luminance values in the respective pixels; and FIG. 11C is a table showing differences between ideal values and the respective average values;

FIG. 16 is a table showing light intensity distributions in the X-axis direction of the imaging element (coordinates X1 to X12) after elapse of every predetermined time period in a second simulation according to one or more embodiments of the present invention;

FIG. 17 is a table showing the light intensity distributions in the X-axis direction of the imaging element (coordinates X13 to X24) after elapse of every predetermined time period in the second simulation according to one or more embodiments of the present invention;

FIG. 18 is a table showing the light intensity distributions in the X-axis direction of the imaging element (coordinates X25 to X36) after elapse of every predetermined time period in the second simulation according to one or more embodiments of the present invention;

FIGS. 19A-19C are tables relating to the second simulation according to one or more embodiments of the present invention: FIG. 19A is a table showing light intensity distributions in an ideal sinusoidal waveform in the X-axis direction of the imaging element (coordinates X1 to X10); FIG. 19B is a table showing respective average values of luminance values in the respective pixels; and FIG. 19C is a table showing differences between ideal values and the respective average values;

FIGS. 20A-20C are tables relating to the second simulation according to one or more embodiments of the present invention: FIG. 20A is a table showing the light intensity distributions in the ideal sinusoidal waveform in the X-axis direction of the imaging element (coordinates X11 to X20); FIG. 20B is a table showing respective average values of luminance values in the respective pixels; and FIG. 20C is a table showing differences between ideal values and the respective average values;

FIGS. 21A-21C are tables relating to the second simulation according to one or more embodiments of the present invention: FIG. 21A is a table showing the light intensity distributions in the ideal sinusoidal waveform in the X-axis direction of the imaging element (coordinates X21 to X30); FIG. 21B is a table showing respective average values of luminance values in the respective pixels; and FIG. 21C is a table showing differences between ideal values and the respective average values;

FIGS. 22A-22C are tables relating to the second simulation according to one or more embodiments of the present invention: FIG. 22A is a table showing the light intensity distributions in the ideal sinusoidal waveform in the X-axis direction of the imaging element (coordinates X31 to X36); FIG. 22B is a table showing respective average values of luminance values in the respective pixels; and FIG. 22C is a table showing differences between ideal values and the respective average values;

DETAILED DESCRIPTION OF EMBODIMENTS

Figure 1:
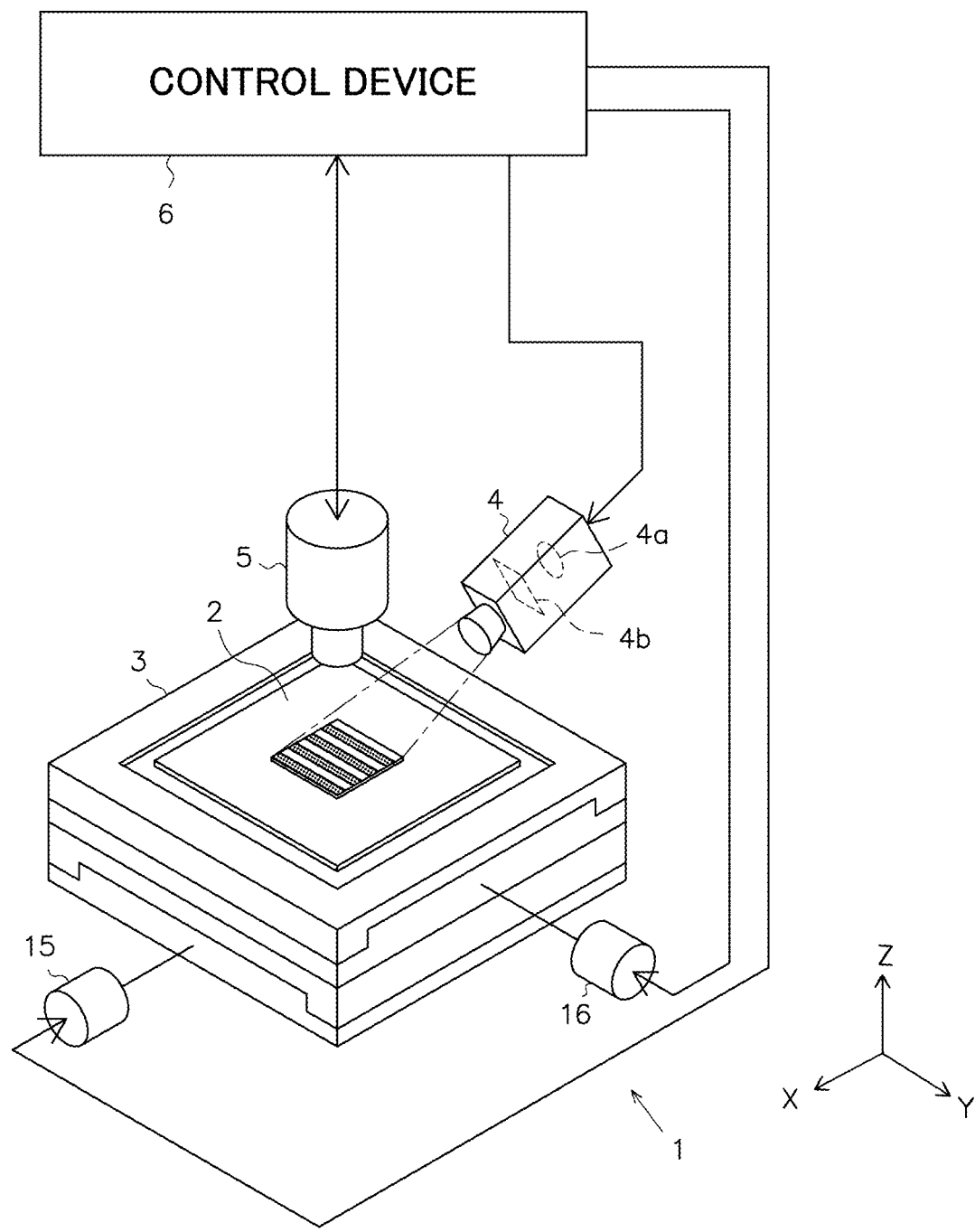
FIG. 1 is a schematic configuration diagram illustrating a substrate inspection apparatus according to one or more embodiments of the present invention.

The following describes one or more embodiments of the present invention with reference to the drawings. FIG. 1 is a schematic configuration diagram illustrating a substrate inspection apparatus 1 equipped with a three-dimensional measurement device according to one or more embodiments of the present invention. As shown in FIG. 1, the substrate inspection apparatus 1 includes: a mounting table 3 in which a printed circuit board 2 specified as a measurement object and provided with solder paste K (shown in FIG. 3) as a measurement target printed thereon is placed on the mounting table 3; an illumination device 4 as the projection unit (projector) configured to project a predetermined striped pattern (striped light pattern) obliquely downward on a surface of the printed circuit board 2; a camera 5 as the imaging unit (imaging device) configured to take an image of a projected part in which the striped pattern is projected on the printed circuit board 2; and a control device 6 configured to execute various controls, image processing and arithmetic processing in the substrate inspection apparatus 1, for example, drive controls of the illumination device 4 and the camera 5. The control device 6 is configured as the image acquirer and as the image processor according to one or more embodiments of the present invention.

The mounting table 3 is equipped with motors 15 and 16. The motors 15 and 16 are driven and controlled by the control device 6 to slide the printed circuit board 2 placed on the mounting table 3 in an arbitrary direction (an X-axis direction and a Y-axis direction).

The illumination device 4 includes a light source 4a configured to emit predetermined light and a grid plate 4b configured to convert the light from the light source 4a into the striped pattern and is driven and controlled by the control device 6. The light emitted from the light source 4a is introduced to a condensing lens (not shown) to be converted to parallel light, is further introduced via the grid plate 4b into a projection lens (not shown) and is projected onto the printed circuit board 2 as the striped pattern.

A telecentric optical system using a focusing lens, a projection lens and the like may be employed as the optical system of the illumination device 4. The height position of the printed circuit board 2 is likely to slightly change while the printed circuit board 2 is moved in an inspection area. The telecentric optical system is not affected by such a change but ensures accurate measurement.

Figure 3:
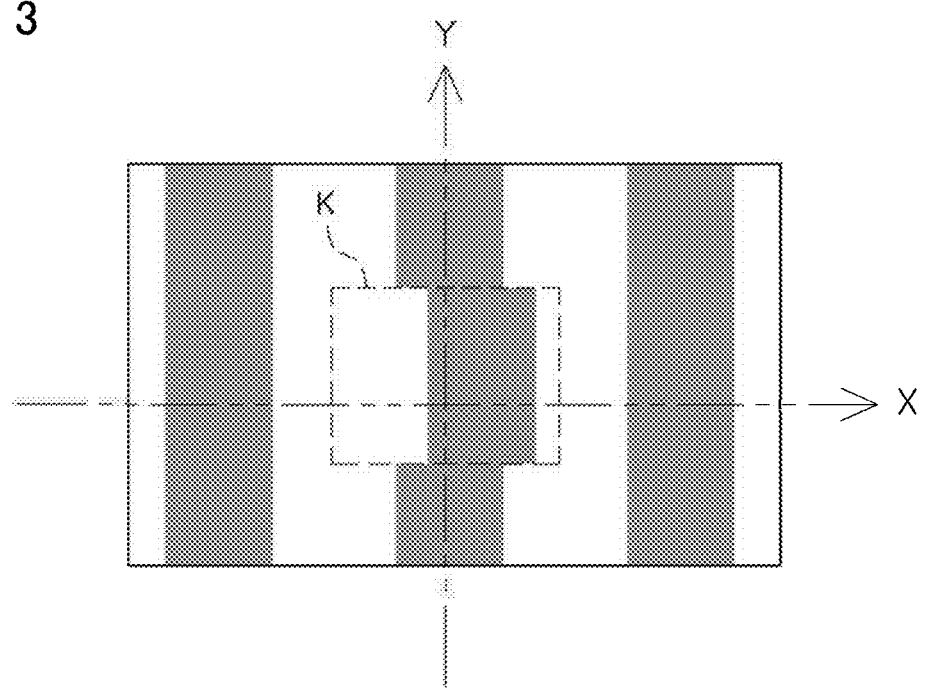
FIG. 3 is a diagram schematically illustrating an example of a striped pattern projected on a printed circuit board according to one or more embodiments of the present invention.

The grid plate 4b is configured such that linear light transmitting portions of transmitting the light and linear light shielding portions of shielding the light are alternately arrayed in a predetermined direction perpendicular to an optical axis of the light source 4a. This configuration enables the striped pattern having a light intensity distribution in a rectangular waveform or in a trapezoidal waveform to be projected on the printed circuit board 2. According to one or more embodiments of the present invention, the striped pattern in which the direction of stripes is perpendicular to the X-axis direction and is parallel to the Y-axis direction is projected as shown in FIG. 3.

The light passing through the grid plate 4b is generally not a completely parallel light and does not provide a perfect rectangular wave, since intermediate tone ranges are likely to be generated on boundaries between "bright portions" and "dark portions" of the striped pattern due to, for example, diffraction effect on the boundaries between the light transmitting portions and the light shielding portions. For simplicity's sake, however, the striped pattern is shown as stripes of light and dark binary values with omission of the intermediate tone ranges in FIG. 3.

Figure 12:
FIG. 12 is a graph showing a light intensity distribution of a striped pattern involved in the first simulation according to one or more embodiments of the present invention.
Figure 13:
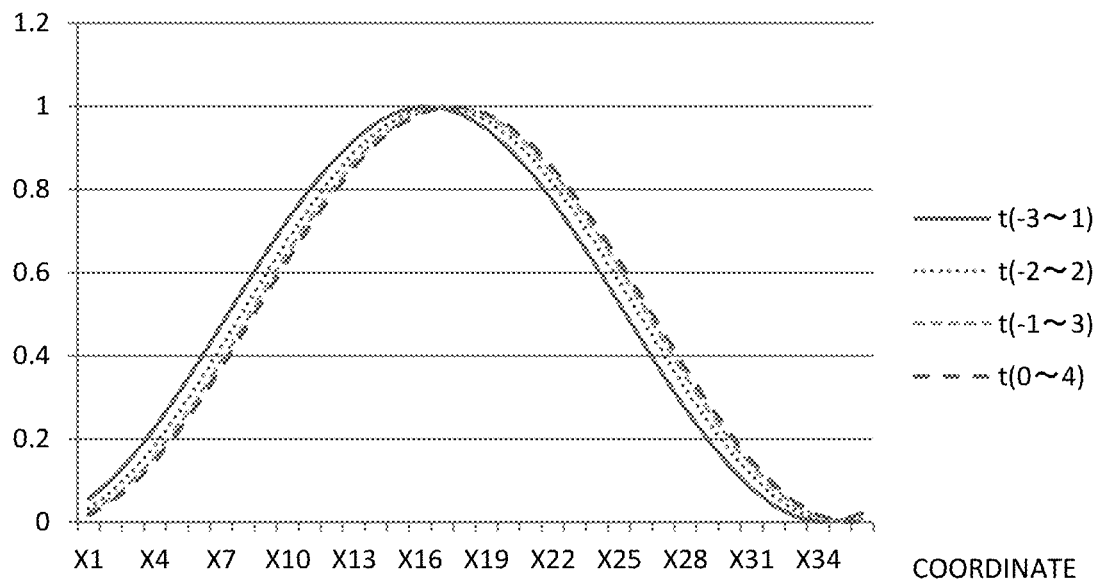
FIG. 13 is a graph showing the light intensity distributions in the ideal sinusoidal waveform shown in FIGS. 8A, 9A, 10A, and 11A.
Figure 23:
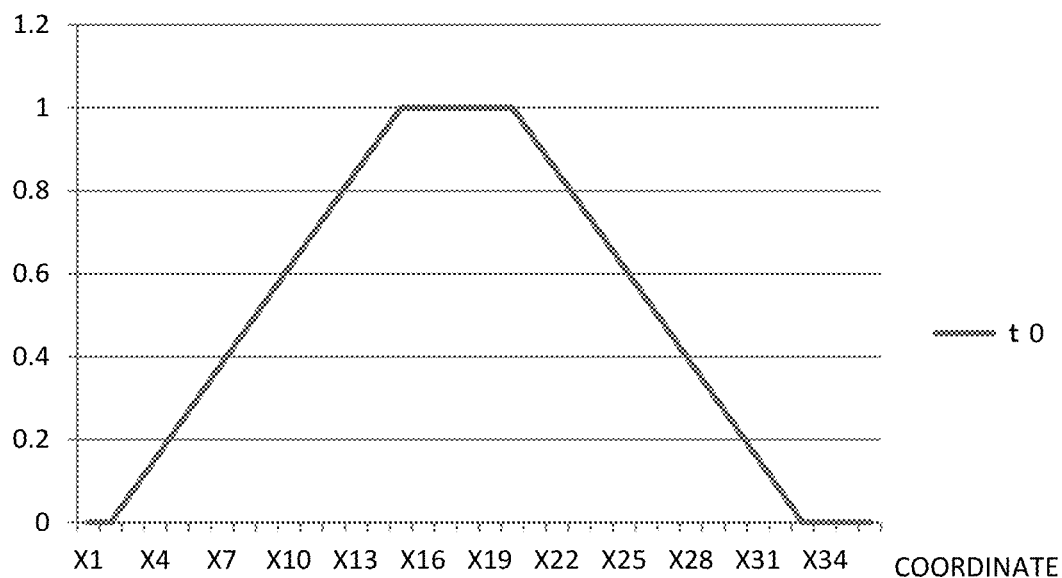
FIG. 23 is a graph showing a light intensity distribution of a striped pattern involved in the second simulation according to one or more embodiments of the present invention.
Figure 24:
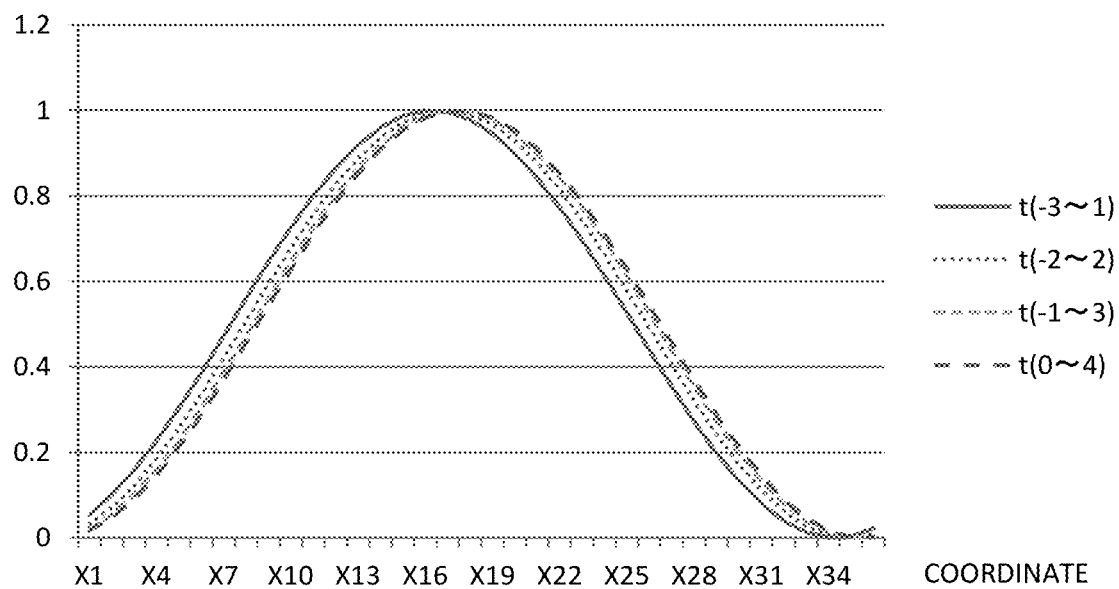
FIG. 24 is a graph showing the light intensity distributions in the ideal sinusoidal waveform shown in FIGS. 19A, 20A, 21A, and 22A.

The resulting striped pattern may depend on the configuration of the grid plate 4b, for example, the arrangement and the intervals of the light transmitting portions and the light shielding portions. A sharp luminance slope of the intermediate tone ranges on the boundaries between the "bright portions" and the "dark portions" provides a striped pattern having a light intensity distribution in a rectangular waveform (as shown in FIG. 12). A gentle luminance slope of the intermediate tone ranges on the boundaries between the "bright portions" and the "dark portions" provides a striped pattern having a light intensity distribution in a trapezoidal waveform (as shown in FIG. 23).

The illumination device 4 includes a drive unit (driver) 4c such as a piezoelectric element to move the grid plate 4b. The control device 6 drives and controls the drive unit 4c to achieve a moving process of moving the grid plate 4b in the predetermined direction perpendicular to the optical axis of the light source 4. This enables the striped pattern projected on the printed circuit board 2 to be intermittently moved with shifting the phase by 90 degrees each (1/4 pitch each) along the X-axis direction.

The camera 5 includes, for example, a lens and an imaging element. According to one or more embodiments of the present invention, a CCD sensor is employed as the imaging element. The imaging element according to one or more embodiments of the present invention has a resolution of, for example, 512 pixels in the X-axis direction (horizontal direction) and 480 pixels in the Y-axis direction (vertical direction).

The image data taken by the camera 5 is converted into a digital signal in the camera 5, is input in the form of the digital signal to the control device 6, and is stored in an image data storage device 24 described later. The control device 6 executes, for example, image processing and arithmetic processing described later, based on the image data.

Figure 2:
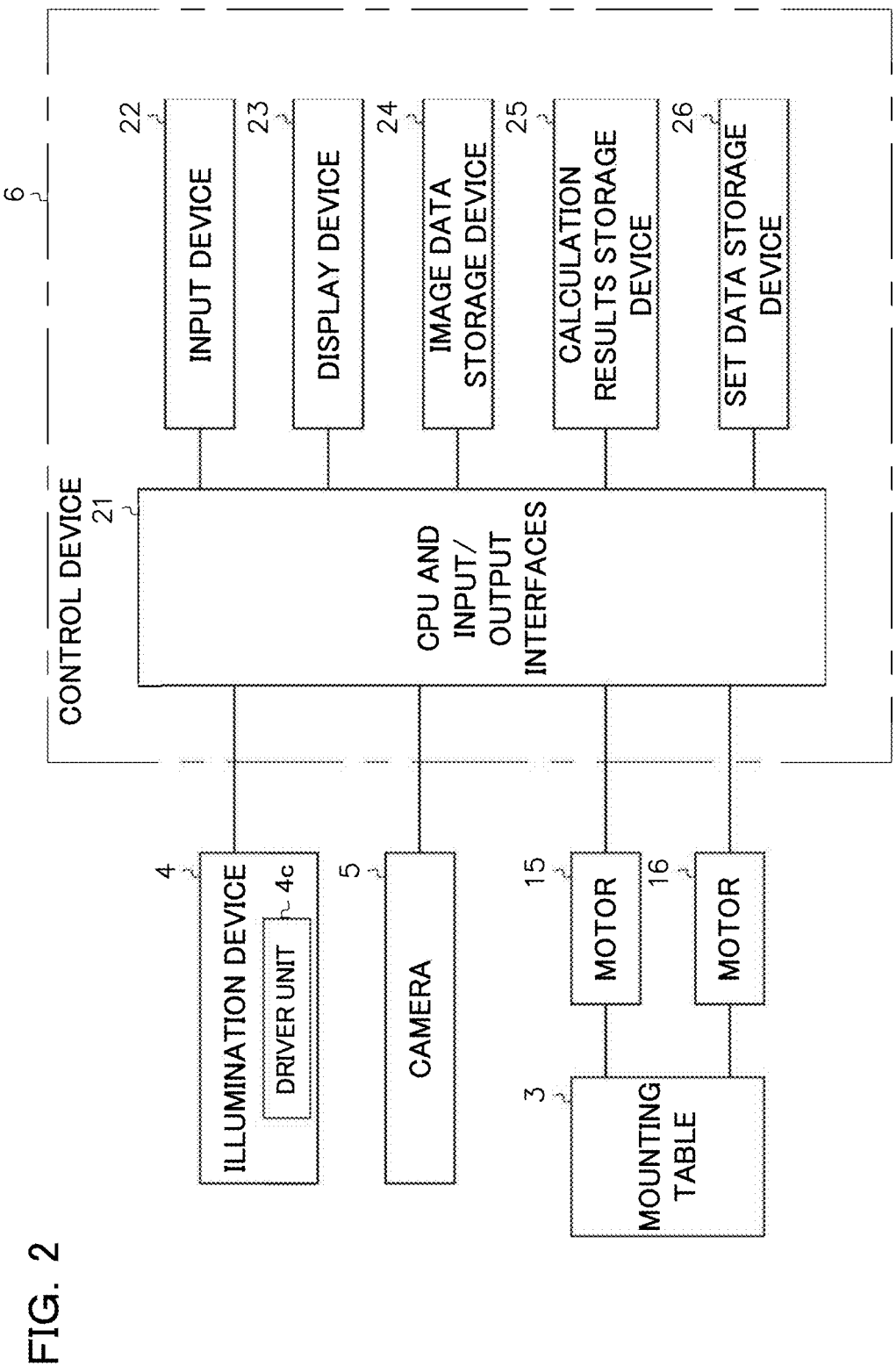
FIG. 2 is a block diagram illustrating the electrical configuration of the substrate inspection apparatus according to one or more embodiments of the present invention.

The following describes the electrical configuration of the control device 6. As shown in FIG. 2, the control device 6 includes a CPU and input/output interfaces 21 (hereinafter referred to as "CPU and the like 21") configured to control the entire substrate inspection apparatus 1, an input device 22 comprised of a keyboard, a mouse, a touch panel and the like as the "input unit", a display device 23 configured as the "display unit" having a display screen such as a CRT or a liquid crystal screen, an image data storage device 24 configured to store image data and the like taken by the camera 5, a calculation results storage device 25 configured to store various calculation results, and a set data storage device 26 configured to store various information such as design data in advance. These devices 22 to 26 are electrically connected with the CPU and the like 21.

Figure 4:
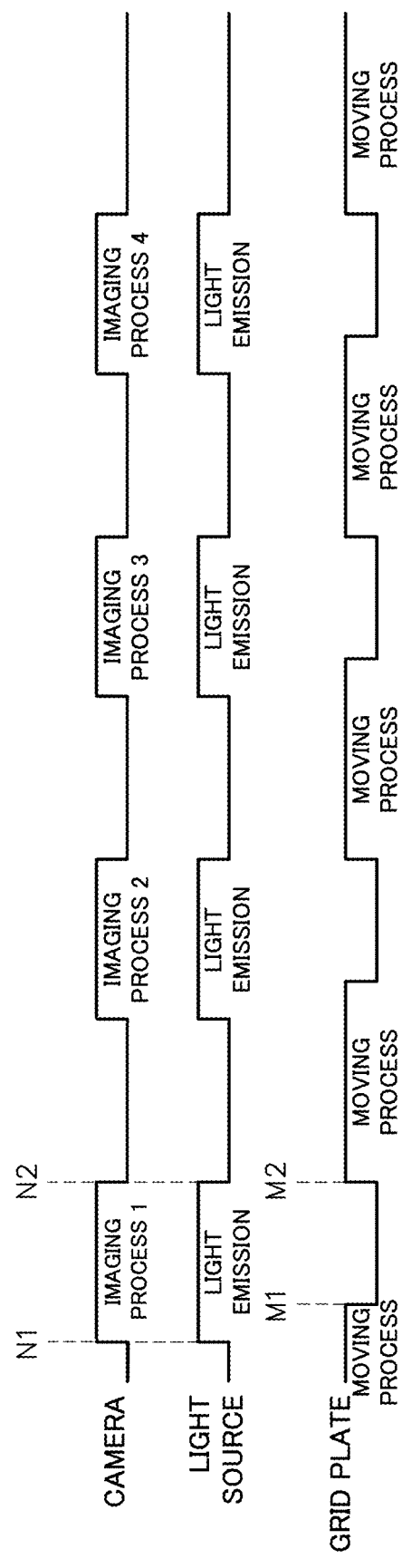
FIG. 4 is a timing chart illustrating processing operations of a camera and an illumination device according to one or more embodiments of the present invention.

The following describes an inspection routine executed with regard to each inspection area of the printed circuit board 2 by the substrate inspection apparatus 1 in detail with reference to FIG. 4. FIG. 4 is a timing chart illustrating processing operations of the camera 5 and the illumination device 4.

This inspection routine is executed by the control device 6 (the CPU and the like 21). According to one or more embodiments of the present invention, the control device 6 executes an image acquisition process four times with regard to each inspection area, so as to obtain four different image data having different light intensity distributions.

The control device 6 first drives and controls the motors 15 and 16 to move the printed circuit board 2 and adjust the field of view of the camera 5 (imaging range) to a predetermined inspection area on the printed circuit board 2. The inspection area denotes one of divisional areas provided by dividing the surface of the printed circuit board 2 in advance with setting the size of the field of view of the camera 5 as one unit.

The control device 6 subsequently drives and controls the illumination device 4 and the camera 5 to move the grid plate 4b to a first set position (for example, a position of a phase "0 degree") and start a first image acquisition process. Four image acquisition processes respectively employ different set positions of the grid plate 4b to shift the phase of the striped pattern at the respective set positions by 90 degrees each (by 1/4 pitch each).

On the start of the first image acquisition process, the control device 6 causes the light source 4a of the illumination device 4 to emit light and start projection of the striped pattern at a predetermined timing N1 and simultaneously starts an imaging process by the camera 5. At this timing, the grid plate 4b is still moving. During the move of the grid plate 4b, the striped pattern projected in an inspection area is continuously moved along the X-axis direction at a fixed rate.

On the start of the imaging process, imaging (exposure) by the camera 5 is executed in a plurality of times during a predetermined imaging period. More specifically, an image of the printed circuit board 2 is taken every time the striped pattern is moved by a predetermined amount Δx (for example, by a distance corresponding to a phase of 10 degrees of the striped pattern), i.e., every when a predetermined time period Δt elapses. Image data taken by the camera 5 every when the predetermined time period Δt elapses are transferred to and stored into the image data storage device 24 as needed.

The control device 6 subsequently terminates the moving process of the grid plate 4b at a predetermined timing M1, while continuing the imaging process.

The control device 6 causes the light source 4a of the illumination device 4 to stop the light emission at a timing N2 after elapse of a predetermined time period since the timing N1 to terminate the projection of the striped pattern, and also terminates the imaging process by the camera 5.

The control device 6 starts the moving process of the grid plate 4b at a timing M2 after elapse of a predetermined time period since the timing M1. According to one or more embodiments of the present invention, the start timing M2 of the moving process of the grid plate 4b is set to be equal to the end timing N2 of the imaging process by the camera 5.

On termination of the imaging process by the camera 5, the control device 6 executes a predetermined arithmetic operation based on the results of imaging obtained by the imaging process. More specifically, the control device 6 executes an averaging process that sums up luminance values of each pixel in a series of image data taken by the imaging process (i.e., a plurality of image data taken every time the striped pattern is moved by the predetermined amount Δx) with regard to each pixel and calculates an average value of each pixel. The control device 6 accordingly obtains image data having a light intensity distribution in a sinusoidal waveform.

The control device 6 then stores the image data obtained by the above averaging process into the calculation results storage device 25 and terminates the first image acquisition process.

After termination of the first image acquisition process or during the above averaging process involved in the first image acquisition process, the control device 6 drives and controls the illumination device 4 and the camera 5 to move the grid plate 4b to a second set position (for example, a position of a phase "90 degrees" that is the phase of the striped pattern shifted by 1/4 pitch from the first set position), and starts a second image acquisition process.

The procedure of the second image acquisition process is similar to the procedure of the first image acquisition process described above, and its detailed description is omitted (the same applies to a third image acquisition process and a fourth image acquisition process).

The control device 6 obtains image data having the light intensity distribution in the sinusoidal waveform by the second image acquisition process, stores the obtained image data into the calculation results storage device 25, and terminates the second image acquisition process.

After termination of the second image acquisition process or during the above averaging process involved in the second image acquisition process, the control device 6 drives and controls the illumination device 4 and the camera 5 to move the grid plate 4b to a third set position (for example, a position of a phase "180 degrees" that is the phase of the striped pattern shifted by 1/4 pitch from the second set position), and starts a third image acquisition process.

The control device 6 obtains image data having the light intensity distribution in the sinusoidal waveform by the third image acquisition process, stores the obtained image data into the calculation results storage device 25, and terminates the third image acquisition process.

After termination of the third image acquisition process or during the above averaging process involved in the third image acquisition process, the control device 6 drives and controls the illumination device 4 and the camera 5 to move the grid plate 4b to a fourth set position (for example, a position of a phase "270 degrees" that is the phase of the striped pattern shifted by 1/4 pitch from the third set position), and starts a fourth image acquisition process.

The control device 6 obtains image data having the light intensity distribution in the sinusoidal waveform by the fourth image acquisition process, stores the obtained image data into the calculation results storage device 25, and terminates the fourth image acquisition process.

Four different image data having different light intensity distributions are obtained by executing the four image acquisition processes as described above. Accordingly, the obtained image data are equivalent to four different image data that are taken by shifting the phase of a striped pattern having a light intensity distribution in a sinusoidal waveform by 90 degrees each.

The control device 6 subsequently executes three-dimensional measurement (height measurement) by the known phase shift method described in Background by using the four different image data (luminance values of respective pixels) obtained as described above and stores the measurement results into the calculation results storage device 25.

The control device 6 subsequently executes a good/poor quality determination process of solder paste K, based on the results of the three-dimensional measurement (height data at respective coordinates). More specifically, the control device 6 detects a printing range of the solder paste K that is higher than a reference plane, based on the measurement results of the inspection area obtained as described above, and integrates the heights at respective locations in this printing range to calculate the printed amount of the solder paste K.

The control device 6 then compares the data of the solder paste K determined as described above, for example, the position, the area, and the height or the amount of the solder paste K, with reference data (for example, Gerber data) stored in advance in the set data storage device 26, and determines the good/poor quality of the printing state of the solder paste K in the inspection area by determining whether the result of comparison is within an allowable range.

During such processing, the control device 6 drives and controls the motors 15 and 16 to move the printed circuit board 2 to a next inspection area and repeatedly executes the series of processing described above with regard to all the inspection areas to complete inspection of the entire printed circuit board 2.

The following describes the results of simulation-based verification of the functions and advantageous effects of the substrate inspection apparatus 1 according to one or more embodiments of the present invention. The results of simulation (first simulation) in projection of a striped pattern having a light intensity distribution in a rectangular waveform are described first with reference to FIGS. 5 to 15.

In this simulation, 36 pixels in the X-axis direction of the imaging element are specified as one cycle. A striped pattern having a light intensity distribution in a rectangular waveform with an intermediate tone range (luminance gradient) of two pixels present on a boundary between a "bright portion" and a "dark portion" is projected and is moved in the X-axis direction by one pixel (corresponding to a phase of 10 degrees of the striped pattern) every when a predetermined time period Δt elapses, by the moving process of the grid plate 4b.

FIGS. 5 to 7 are tables showing a relationship between coordinate positions of respective pixels in the X-axis direction of the imaging element (horizontal axis: coordinates X1 to X36) and luminance values of a striped pattern varying with elapse of time (vertical axis: time t(−8) to time t(4)). FIGS. 5 to 7 are accordingly tables showing light intensity distributions in the X-axis direction of the imaging element after elapse of every predetermined time period. The simulation is performed on the assumption that the luminance value of the "bright portion" having the maximum luminance is "1" and that the luminance value of the "dark portion" having the minimum luminance is "0".

FIGS. 5 to 7 show only one cycle (36 pixels in the X-axis direction) of the striped pattern. In the actual state, however, multiple cycles of the striped pattern are continuously present in the X-axis direction. In other words, the light intensity distributions shown in the range of the coordinate X1 to the coordinate X36 are present repeatedly. In FIGS. 5 to 7, the moving end timing M1 of the grid plate 4b is specified as a reference time t(0). A time period from the time t(−8) to the time t(0) on the vertical axis provides a light intensity distribution during a moving period of the grid plate 4b. A time period from the time t(0) to the time t(4) on the vertical axis provides a light intensity distribution during a stop period of the grid plate 4b.

As shown in FIGS. 5 to 7, at the time t(−8), a range from the coordinate X2 to the coordinate X17 forms a "bright portion" having the luminance value "1", and a range from the coordinate X20 to the coordinate X35 forms a "dark portion" having the luminance value "0". An intermediate tone range of two pixels having gradually changing luminance values is present across the coordinates X36 and X1 and across the coordinates X18 and X19respectively corresponding to the boundary between the "bright portion" and the "dark portion".

At the time t(−7) after elapse of the predetermined time period Δt since the time t(−8), a range from the coordinate X3 to the coordinate X18 forms a "bright portion" having the luminance value "1", and a range from the coordinate X21 to the coordinate X36 forms a "dark portion" having the luminance value "0". At the time t(−6) after elapse of the predetermined time period Δt since the time t(−7), a range from the coordinate X4 to the coordinate X19 forms a "bright portion" having the luminance value "1", and a range from the coordinate X22 to the coordinate X1 forms a "dark portion" having the luminance value "0".

In this manner, the light intensity distribution of the striped pattern is moved by one pixel rightward in FIGS. 5 to 7 every when the predetermined time period Δt elapses during the moving period of the grid plate 4b. The light intensity distribution of the striped pattern does not change after the stop of the grid plate 4b (for the time period from the time t(0) to the time t(4). More specifically, for the time period from the time t(0) to the time t(4), a range from the coordinate X10 to the coordinate X25 forms a "bright portion" having the luminance value "1", and a range from the coordinate X28 to the coordinate X7 forms a "dark portion" having the luminance value "0". An intermediate tone range of two pixels having gradually changing luminance values is present across the coordinates X26 and X27 and across the coordinates X8 and X9 respectively corresponding to the boundary between the "bright portion" and the "dark portion". The light intensity distribution of the striped pattern during the stop period of the grid plate 4b (for example, at the time t(0)) is shown as a graph of FIG. 12.

The following describes verification by comparison with a striped pattern having a light intensity distribution in an ideal sinusoidal waveform. FIGS. 8A, 9A, 10A, and 11A show a relationship of a light intensity distribution in an ideal sinusoidal waveform (ideal values) to coordinate positions (coordinates X1 to X36) of the respective pixels in the X-axis direction of the imaging element. More specifically, FIGS. 8A, 9A, 10A, and 11A show light intensity distributions in the ideal sinusoidal waveform having an identical cycle, an identical amplitude and an identical phase with those of a striped pattern having the light intensity distributions in the rectangular waveform described above in an imaging period [t(−3-1)], an imaging period [t(−2-2)], an imaging period [t(−1-3)] and an imaging period [t(0-4)] set as predetermined imaging periods (five-fold length of the predetermined time period Δt). The light intensity distributions in the ideal sinusoidal waveform in the respective imaging periods are shown as a graph of FIG. 13.

FIGS. 8B, 9B, 10B, and 11B are tables showing the results of the averaging process (average values) with regard to a plurality of image data (luminance values of respective pixels) taken in the imaging period [t(−3-1)], the imaging period [t(−2-2)], the imaging period [t(−1-3)] and the imaging period [t(0-4)] at the coordinate positions of the respective pixels in the X-axis direction of the imaging element (horizontal axis: coordinates X1 to X36).

More specifically, in FIGS. 8B, 9B, 10B, and 11B, the bottom column shows, as the comparative example, average values calculated by averaging five image data (luminance values of respective pixels) respectively taken at the time t(0), the time t(1), the time t(2), the time t(3) and the time t(4) in the imaging period [t(0-4)] that includes only a stop period but does not include any moving period of the grid plate 4b.

The second column from the bottom shows average values calculated by averaging five image data (luminance values of respective pixels) respectively taken at the time t(−1), the time t(0), the time t(1), the time t(2) and the time t(3) in the imaging period [t(−1-3)].

The third column from the bottom shows average values calculated by averaging five image data (luminance values of respective pixels) respectively taken at the time t(1 2), the time t(−1), the time t(0), the time t(1) and the time t(2) in the imaging period [t(−2-2)].

The fourth column from the bottom shows average values calculated by averaging five image data (luminance values of respective pixels) respectively taken at the time t(−3), the time t(−2), the time t(−1), the time t(0) and the time t(1) in the imaging period [t(−3-1)].

Figure 14:
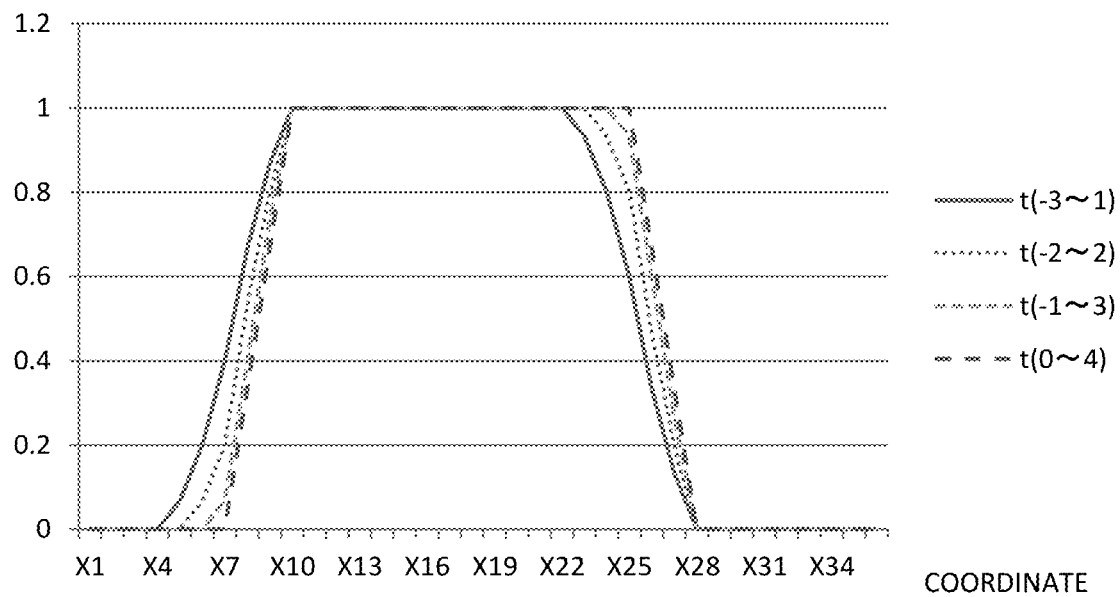
FIG. 14 is a graph showing plots of the respective average values shown in FIGS. 8B, 9B, 10B, and 11B.

The above respective average values shown in FIGS. 8B, 9B, 10B, and 11B are plotted as shown in a graph of FIG. 14.

FIGS. 8C, 9C, 10C, and 11C are tables showing differences between the respective ideal values shown in FIGS. 8A, 9A, 10A, and 11A and the respective average values shown in FIGS. 8B, 9B, 10B, and 11B at the coordinate positions of the respective pixels in the X-axis direction of the imaging element (horizontal axis: coordinates X1 to X36).

More specifically, in FIGS. 8C, 9C, 10C, and 11C, the bottom column shows, as the comparative example, differences between the respective average values and the respective ideal values of the image data (luminance values of respective pixels) taken in the imaging period [t(0-4)].

The second column from the bottom shows differences between the respective average values and the respective ideal values of the image data (luminance values of respective pixels) taken in the imaging period [t(−1-3)]. The third column from the bottom shows differences between the respective average values and the respective ideal values of the image data (luminance values of respective pixels) taken in the imaging period [t(−2-2)]. The fourth column from the bottom shows differences between the respective average values and the respective ideal values of the image data (luminance values of respective pixels) taken in the imaging period [t(−3-1)].

Figure 15:
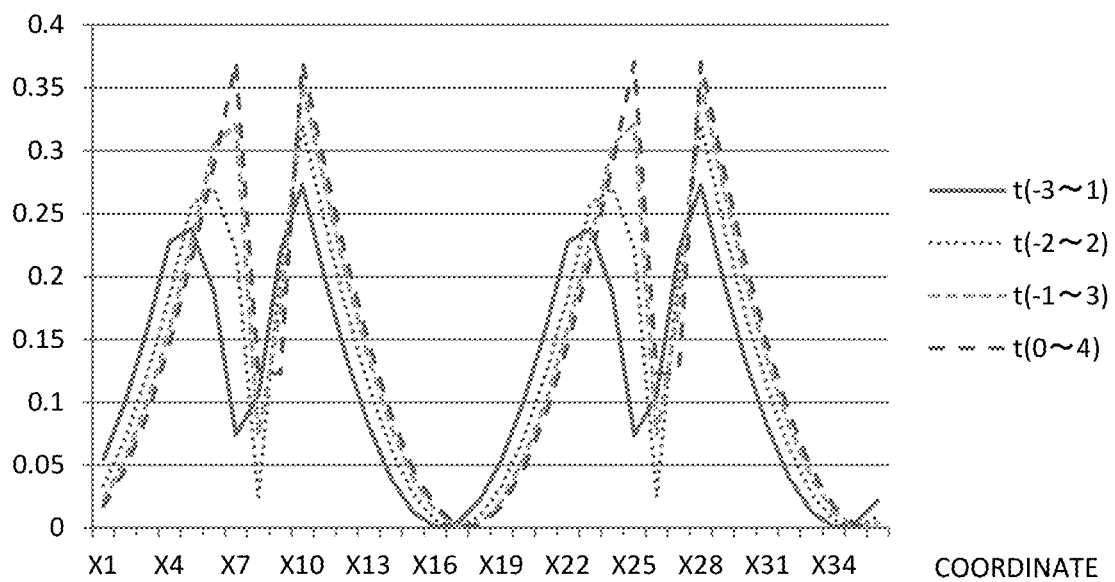
FIG. 15 is a graph showing plots of the differences between the respective average values and the ideal values shown in FIGS. 8C, 9C, 10C, and 11C.

The above respective values shown in FIGS. 8C, 9C, 10C, and 11C are plotted as shown in a graph of FIG. 15. The right end of FIG. 11C shows average values and maximum values of the above respective values of the respective pixels (coordinates X1 to X36) in the X-axis direction of the imaging element, with regard to the respective imaging periods.

As clearly shown in, for example, the right end of FIG. 11C, FIG. 14 and FIG. 15, the difference from the ideal sinusoidal waveform (ideal value) decreases with an increase in moving period included in the imaging period. For example, the imaging period [t(−1-3)] has the smaller difference than the imaging period [t(0-4)], and the imaging period [t(−2-2)] has the smaller difference than the imaging period [t(−1-3)]. The imaging period [t(−3-1)] has the smallest difference. Accordingly, in this simulation, three-dimensional measurement is executed by the phase shift method using the image data taken in the imaging period [t(−3-1)].

The following describes the results of simulation (second simulation) in projection of a striped pattern having a light intensity distribution in a trapezoidal waveform are described first with reference to FIGS. 16 to 26.

In this simulation, 36 pixels in the X-axis direction of the imaging element are specified as one cycle. A striped pattern having a light intensity distribution in a trapezoidal waveform with an intermediate tone range (luminance gradient) of 12 pixels present on a boundary between a "bright portion" and a "dark portion" is projected and is moved in the X-axis direction by one pixel (corresponding to a phase of 10 degrees of the striped pattern) every when a predetermined time period Δt elapses, by the moving process of the grid plate 4b.

FIGS. 16 to 18 are tables showing a relationship between coordinate positions of respective pixels in the X-axis direction of the imaging element (horizontal axis: coordinates X1 to X36) and luminance values of a striped pattern varying with elapse of time (vertical axis: time t(−8) to time t(4)). FIGS. 16 to 18 are accordingly tables showing light intensity distributions in the X-axis direction of the imaging element after elapse of every predetermined time period. The simulation is performed on the assumption that the luminance value of the "bright portion" having the maximum luminance is "1" and that the luminance value of the "dark portion" having the minimum luminance is "0".

FIGS. 16 to 18 show only one cycle (36 pixels in the X-axis direction) of the striped pattern. In the actual state, however, multiple cycles of the striped pattern are continuously present in the X-axis direction. In other words, the light intensity distributions shown in the range of the coordinate X1 to the coordinate X36 are present repeatedly. In FIGS. 16 to 18, the moving end timing M1 of the grid plate 4b is specified as a reference time t(0). A time period from the time t(−8) to the time t(0) on the vertical axis provides a light intensity distribution during a moving period of the grid plate 4b. A time period from the time t(0) to the time t(4) on the vertical axis provides a light intensity distribution during a stop period of the grid plate 4b.

As shown in FIGS. 16 to 18, at the time t(−8), a range from the coordinate X7 to the coordinate X12 forms a "bright portion" having the luminance value "1", and a range from the coordinate X25 to the coordinate X30 forms a "dark portion" having the luminance value "0". An intermediate tone range of 12 pixels having gradually changing luminance values is present across the coordinates X31 and X6 and across the coordinates X13 and X24 respectively corresponding to the boundary between the "bright portion" and the "dark portion".

At the time t(−7) after elapse of the predetermined time period Δt since the time t(−8), a range from the coordinate X8 to the coordinate X13 forms a "bright portion" having the luminance value "1", and a range from the coordinate X26 to the coordinate X31 forms a "dark portion" having the luminance value "0". At the time t(−6) after elapse of the predetermined time period Δt since the time t(−7), a range from the coordinate X9 to the coordinate X14 forms a "bright portion" having the luminance value "1", and a range from the coordinate X27 to the coordinate X32 forms a "dark portion" having the luminance value "0".

In this manner, the light intensity distribution of the striped pattern is moved by one pixel rightward in FIGS. 16 to 18 every when the predetermined time period Δt elapses during the moving period of the grid plate 4b. The light intensity distribution of the striped pattern does not change after the stop of the grid plate 4b (for the time period from the time t(0) to the time t(4)). More specifically, for the time period from the time t(0) to the time t(4), a range from the coordinate X15 to the coordinate X20 forms a "bright portion" having the luminance value "1", and a range from the coordinate X33 to the coordinate X2 forms a "dark portion" having the luminance value "0". An intermediate tone range of 12 pixels having gradually changing luminance values is present across the coordinates X21 and X32 and across the coordinates X3 and X14 respectively corresponding to the boundary between the "bright portion" and the "dark portion". The light intensity distribution of the striped pattern during the stop period of the grid plate 4b (for example, at the time t(0)) is shown as a graph of FIG. 23.

The following describes verification by comparison with a striped pattern having a light intensity distribution in an ideal sinusoidal waveform. FIGS. 19A, 20A, 21A, and 22A show a relationship of a light intensity distribution in an ideal sinusoidal waveform (ideal values) to coordinate positions (coordinates X1 to X36) of the respective pixels in the X-axis direction of the imaging element. More specifically, FIGS. 19A, 20A, 21A, and 22A show light intensity distributions in the ideal sinusoidal waveform having an identical cycle, an identical amplitude and an identical phase with those of a striped pattern having the light intensity distributions in the trapezoidal waveform described above in an imaging period [t(−3-1)], an imaging period [t(−2-2)], an imaging period [t(−1-3)] and an imaging period [t(0-4)] set as predetermined imaging periods (five-fold length of the predetermined time period Δt). The light intensity distributions in the ideal sinusoidal waveform in the respective imaging periods are shown as a graph of FIG. 24.

FIGS. 19B, 20B, 21B, and 22B are tables showing the results of the averaging process (average values) with regard to a plurality of image data (luminance values of respective pixels) taken in the imaging period [t(−3-1)], the imaging period [t(−2-2)], the imaging period [t(−1-3)] and the imaging period [t(0-4)] at the coordinate positions of the respective pixels in the X-axis direction of the imaging element (horizontal axis: coordinates X1 to X36).

More specifically, in FIGS. 19B, 20B, 21B, and 22B, the bottom column shows, as a comparative example, average values calculated by averaging five image data (luminance values of respective pixels) respectively taken at the time t(0), the time t(1), the time t(2), the time t(3) and the time t(4) in the imaging period [t(0-4)] that includes only a stop period but does not include any moving period of the grid plate 4b.

The second column from the bottom shows average values calculated by averaging five image data (luminance values of respective pixels) respectively taken at the time t(−1), the time t(0), the time t(1), the time t(2) and the time t(3) in the imaging period [t(−1-3)].

The third column from the bottom shows average values calculated by averaging five image data (luminance values of respective pixels) respectively taken at the time t(−2), the time t(−1), the time t(0), the time t(1) and the time t(2) in the imaging period [t(−2-2)].

The fourth column from the bottom shows average values calculated by averaging five image data (luminance values of respective pixels) respectively taken at the time t(−3), the time t(−2), the time t(−1), the time t(0) and the time t(1) in the imaging period [t(−3-1)].

Figure 25:
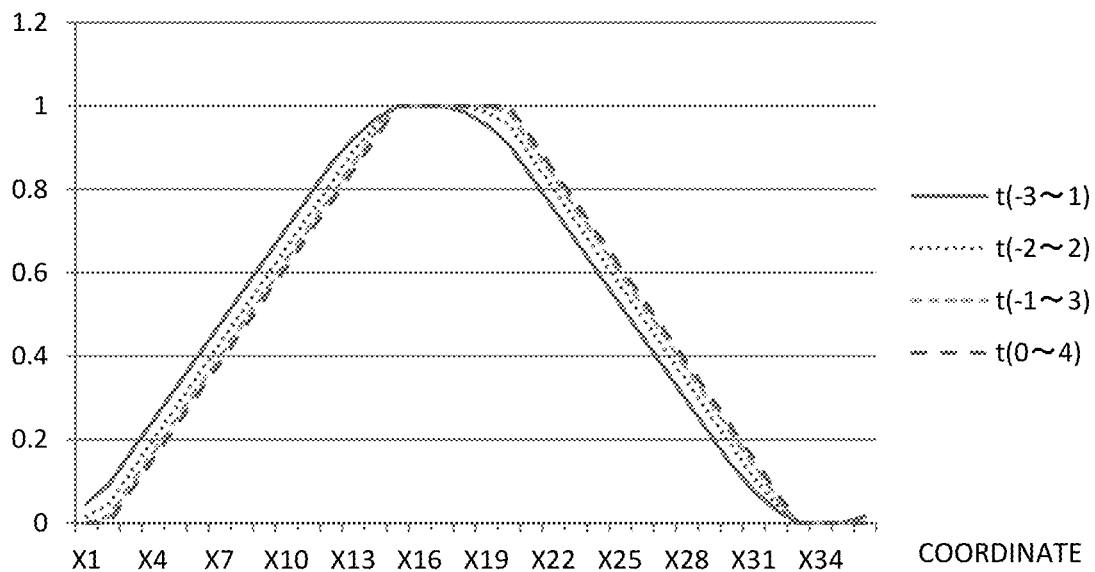
FIG. 25 is a graph showing plots of the respective average values shown in FIGS. 19B, 20B, 21B, and 22B.

The above respective average values shown in FIGS. 19B, 20B, 21B, and 22B are plotted as shown in a graph of FIG. 25.

FIGS. 19C, 20C, 21C, and 22C are tables showing differences between the respective ideal values shown in FIGS. 19A, 20A, 21A, and 22A and the respective average values shown in FIGS. 19B, 20B, 21B, and 22B at the coordinate positions of the respective pixels in the X-axis direction of the imaging element (horizontal axis: coordinates X1 to X36).

More specifically, in FIGS. 19C, 20C, 21C, and 22C, the bottom column shows, as the comparative example, differences between the respective average values and the respective ideal values of the image data (luminance values of respective pixels) taken in the imaging period [t(0-4)].

The second column from the bottom shows differences between the respective average values and the respective ideal values of the image data (luminance values of respective pixels) taken in the imaging period [t(−1-3)]. The third column from the bottom shows differences between the respective average values and the respective ideal values of the image data (luminance values of respective pixels) taken in the imaging period [t(−2-2)]. The fourth column from the bottom shows differences between the respective average values and the respective ideal values of the image data (luminance values of respective pixels) taken in the imaging period [t(−3-1)].

Figure 26:
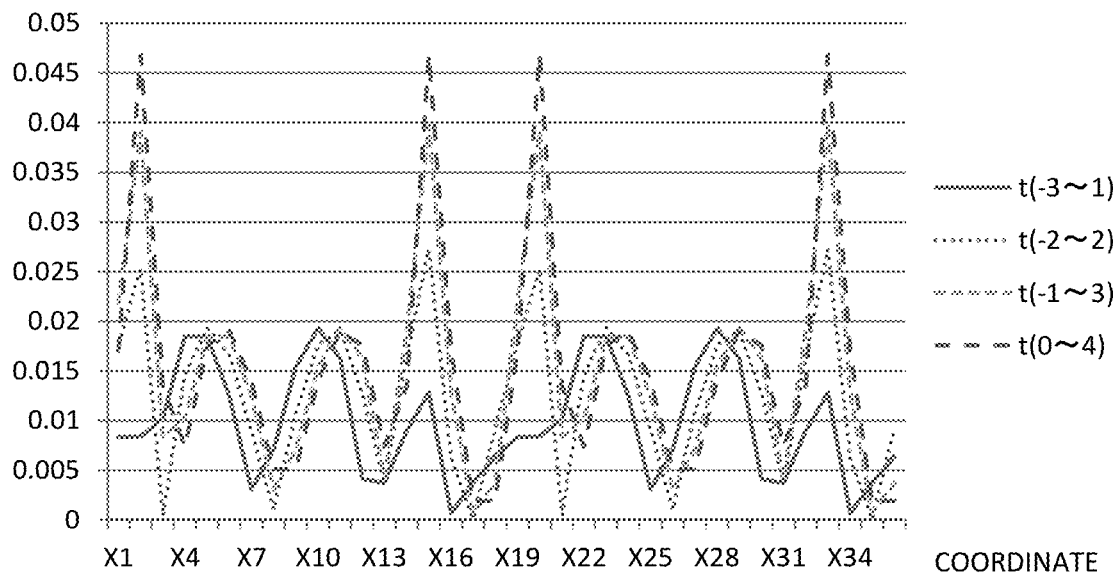
FIG. 26 is a graph showing plots of the differences between the respective average values and the ideal values shown in FIGS. 19C, 20C, 21C, and 22C.

The above respective values shown in FIGS. 19C, 20C, 21C, and 22C are plotted as shown in a graph of FIG. 26. The right end of FIG. 22C shows average values and maximum values of the above respective values of the respective pixels (coordinates X1 to X36) in the X-axis direction of the imaging element, with regard to the respective imaging periods.

As clearly shown in, for example, the right end of FIG. 22C, FIG. 25 and FIG. 26, the difference from the ideal sinusoidal waveform (ideal value) decreases with an increase in moving period included in the imaging period. For example, the imaging period [t(−1-3)] has the smaller difference than the imaging period [t(0-4)], and the imaging period [t(−2-2)] has the smaller difference than the imaging period [t(−1-3)]. The imaging period [t(−3-1)] has the smallest difference. Accordingly, in this simulation, three-dimensional measurement is executed by the phase shift method using the image data taken in the imaging period [t(−3-1)].

As described above in detail, according to one or more embodiments of the present invention, the imaging period includes not only the stop period of the intermittently moving grid plate 4b (striped pattern) but part of the moving period prior to the stop period. One or more embodiments of the present invention take an image of the striped pattern in a plurality of times during stop and during move in this imaging period, sum up the luminance values of each pixel in a series of taken image data with regard to each pixel and calculate an average value.

In the process of obtaining each image data among a plurality of image data having different light intensity distributions required for three-dimensional measurement by the phase shift method, this configuration can obtain image data having a light intensity distribution closer to the ideal sinusoidal waveform, compared with a configuration that simply projects a striped pattern having a light intensity distribution in a rectangular waveform or in a trapezoidal waveform and takes an image of the striped pattern only during a stop period.

One or more embodiments of the present invention can obtain image data having a light intensity distribution in a sinusoidal waveform even when projecting the striped pattern in focus. Projecting the striped pattern in focus enables the light intensity distribution (waveform) of the striped pattern to be readily maintained.

As a result, this configuration dramatically improves the measurement accuracy in three-dimensional measurement by using the phase shift method.

Moreover, one or more embodiments of the present invention project a striped pattern having a light intensity distribution that is not in a sinusoidal waveform but is in a rectangular waveform or in a trapezoidal waveform without complicating the mechanical configuration and obtain image data having a light intensity distribution in a sinusoidal waveform by, for example, the relatively simple control process and arithmetic process. As a result, this suppresses complication of the mechanical configuration and reduces the manufacturing cost.

Additionally, one or more embodiments of the present invention are configured to start an imaging process without waiting for termination of a moving process of the grid plate 4b. This configuration shortens the stop period of the grid plate 4b and increases the speed of measurement.

The present disclosure is not limited to the aforementioned embodiments but may be implemented, for example, by configurations described below. The present disclosure may also be naturally implemented by applications and modifications other than those illustrated below.

(a) According to the aforementioned embodiments, the three-dimensional measurement device is embodied in the substrate inspection apparatus 1 configured to measure the height of solder paste printed and formed on the printed circuit board 2. This is, however, not restrictive. For example, the three-dimensional measurement device may be embodied in a configuration of measuring the height of another object, for example, a solder bump printed on a substrate or an electronic component mounted on a substrate.

(b) The aforementioned embodiments are configured to obtain four different image data that have initial phases of a striped pattern that differ by 90 degrees each and that are used for three-dimensional measurement by the phase shift method. The frequency of phase shift and the amount of phase shift are, however, not limited to this configuration. Another frequency of phase shift and another amount of phase shift may be employed as long as these allow for three-dimensional measurement by the phase shift method.

For example, three different image data having phases that differ by 120 degrees each (or by 90 degrees each) may be obtained and used for three-dimensional measurement. In another example, two different image data having phases that differ by 180 degrees (or by 90 degrees) may be obtained and used for three-dimensional measurement.

(c) The aforementioned embodiments are configured to project a striped pattern having a light intensity distribution in a rectangular waveform or in a trapezoidal waveform and obtain image data having a light intensity distribution in a sinusoidal waveform.

This configuration is, however, not restrictive, but a modification may be configured to project a striped pattern having a light intensity distribution in another non-sinusoidal waveform, for example, in a triangular waveform or in a sawtooth waveform and obtain image data having a light intensity distribution in a sinusoidal waveform. If possible, another modification may be configured to project a striped pattern having a light intensity distribution in a rectangular waveform without an intermediate tone range (luminance gradient) and obtain image data having a light intensity distribution in a sinusoidal waveform.

Another modification may be configured to project a striped pattern having a light intensity distribution that is not in an ideal sinusoidal waveform but in a quasi-sinusoidal waveform (in a sinusoidal waveform) and obtain image data having a light intensity distribution in a waveform closer to the ideal sinusoidal waveform.

(d) The configuration of the projection unit is not limited to the illumination device 4 described in the aforementioned embodiments.

For example, the aforementioned embodiments employ the grid plate 4b as the grid configured to convert the light from the light source 4a into a striped pattern.

This is, however, not restrictive, and a liquid crystal panel may be employed as the grid. The liquid crystal panel has a liquid crystal layer that is formed between a pair of transparent substrates and includes a common electrode placed on one transparent substrate and a plurality of strip electrodes arrayed in parallel on the other transparent substrate to be opposed to the common electrode. A driving circuit controls on and off switching elements (for example, thin-film transistors) respectively connected with the respective strip electrodes to regulate the voltage applied to each strip electrode. This accordingly changes over the light transmittance of each grid line corresponding to each strip electrode and forms a grid pattern in which light transmitting portions of high light transmittance and light shielding portions of low light transmittance are alternately arranged. The moving process of the grid is executed by switchover control of the positions of the light transmitting portions and the light shielding portions.

In place of the liquid crystal panel, a DLP (registered trademark) using a digital mirror device may be employed as the grid.

(e) The aforementioned embodiments employ the binary grid (grid plate 4b) in which the light transmitting portions and the light shielding portions are alternately arranged. This is, however, not restrictive. For example, the grid plate or the liquid crystal panel may be configured to form a multivalued grid pattern that changes the transmittance at three or more different levels.

(f) The aforementioned embodiments are configured to start an imaging process by the camera 5 (imaging start timing N1) prior to termination of moving of the grid plate 4b (moving end timing M1) and to start moving the grid plate 4b (moving start timing M2) simultaneously with termination of the imaging process (imaging end timing N2).

Figure 27A:
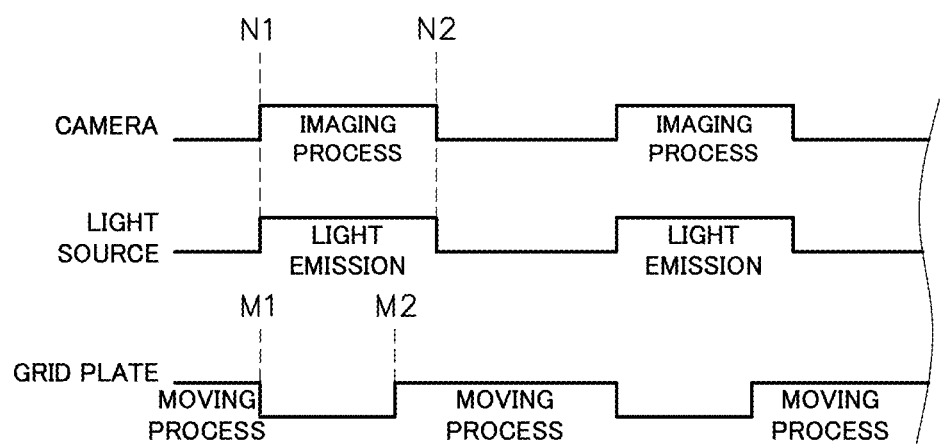
FIGS. 27A and 27B are timing charts illustrating processing operations of the camera and the illumination device according to one or more embodiments of the present invention.

This configuration is, however, not restrictive. A modification may be configured to start an imaging process by the camera 5 (imaging start timing N1) simultaneously with termination of moving of the grid plate 4b (moving end timing M1) and to start moving the grid plate 4b (moving start timing M2) prior to termination of the imaging process (imaging end timing N2) as shown in FIG. 27A.

Figure 27B:
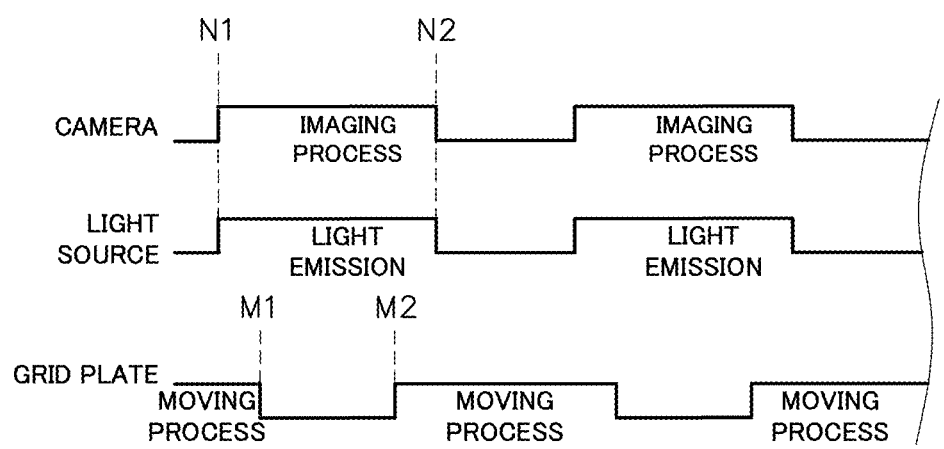
Figure 28:
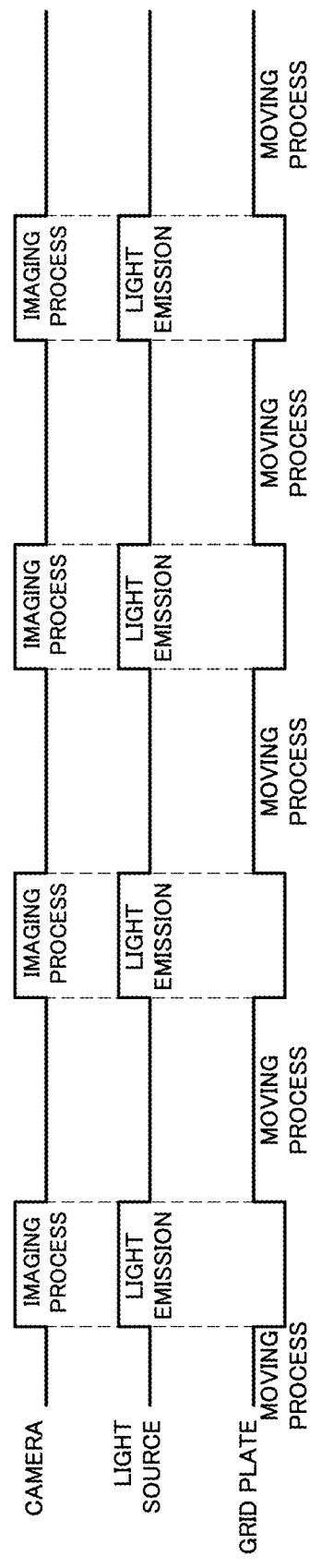
FIG. 28 is a timing chart illustrating processing operations of a related art camera and a related art illumination device.

Another modification may be configured to start an imaging process by the camera 5 (imaging start timing N1) prior to termination of moving of the grid plate 4b (moving end timing M1) and to start moving the grid plate 4b (moving start timing M2) prior to termination of the imaging process (imaging end timing N2) as shown in FIG. 27B.

(g) The aforementioned embodiments are configured to move the grid plate 4b by the drive unit 4c such as a piezoelectric element. The drive unit 4c is, however, not limited to this configuration. For example, a modification may be configured to move the grid plate 4b by a motor or the like.

The aforementioned embodiments are configured to execute, for example, one moving process (moving corresponding to one phase shift amount) by one moving operation (continuous operation). This configuration is, however, not restrictive. A modification may be configured to execute one moving process by multiple moving operations of every predetermined amount.

(h) The aforementioned embodiments are configured to execute imaging (exposure) in a plurality of times during an imaging period in each image acquisition process, sum up the luminance values of each pixel in a series of taken image data with regard to each pixel and calculate an average value.

This configuration is, however, not restrictive. A modification may be configured to omit the process of calculating an average value and to execute three-dimensional measurement based on summed data (image data) by summing up the luminance values of each pixel in a series of image data with regard to each pixel.

Another modification may be configured to execute continuously execute imaging (exposure) during an imaging period in each image acquisition process and to execute three-dimensional measurement based on the taken image data.

In general, the higher amount of light received by the imaging element (the higher light receiving amount) provides an image of the better picture quality that is more suitable for measurement, i.e., an image with the less effects of noise and quantization error. The long imaging (exposure) time, however, causes the imaging element to reach its saturation level and provide an image with "halation". The configuration of executing imaging (exposure) repeatedly in a plurality of times during an imaging period and summing up the luminance values with regard to each pixel like the aforementioned embodiments provides an image of the higher light receiving amount without causing saturation.

In such a range that the imaging element does not reach its saturation level, continuous imaging (exposure) during an imaging period has the smaller processing load.

(i) The aforementioned embodiments employ the CCD sensor as the imaging element of the camera 5. The imaging element is, however, not limited to the aforementioned embodiments, but for example, a CMOS sensor may be employed as the imaging element.

A general CCD camera is not capable of transferring data during exposure. In the case where imaging (exposure) is executed in a plurality of times during an imaging period like the aforementioned embodiments, there is a need to transfer (read out) data between imaging operations.

In the case where a CMOS camera or a CCD camera with the function that enables exposure during data transfer is employed as the camera 5, imaging (exposure) and data transfer are allowed to be executed in a partly overlapped manner. This shortens the measurement time.

(j) According to the aforementioned embodiments, the five-fold length of the predetermined time period Δt (corresponding to the phase of 50 degrees) is set as the imaging period. The imaging period is, however, not limited to the aforementioned embodiments. With a view to suppressing reduction of the measurement accuracy, the length of the imaging period is set to be equal to or shorter than one moving period of the grid plate 4b, i.e., a period in which the grid plate 4b is moved by a length corresponding to one phase shift amount (for example, corresponding to the phase of 90 degrees according to the aforementioned embodiments).

As described above, an increase in ratio of the moving period of the grid plate 4b included in the imaging period decreases a difference from the ideal sinusoidal waveform. Imaging beyond a period of moving corresponding to a predetermined phase shift amount is, however, likely to deviate the waveform of a light intensity distribution of image data from the ideal sinusoidal waveform.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . substrate inspection apparatus, 2 . . . printed circuit board, 4 . . . illumination device, 4a . . . light source, 4b . . . grid plate, 5 . . . camera, 6 . . . control device, 24 . . . image data storage unit

What is claimed is:

1. A three-dimensional measurement device comprising:
a projector comprising:
a light source that emits a predetermined light;
a grid that converts the light from the light source into a predetermined striped pattern; and
a driver that moves the grid, wherein the projector projects the striped pattern onto a measurement object;
an imaging device that takes an image of the measurement object on which the striped pattern is projected; and
a controller that:
controls the projector and the imaging device to obtain a plurality of image data having different light intensity distributions;
executes three-dimensional measurement of the measurement object by phase shifting based on the plurality of image data having different light intensity distributions; and
obtains each of the image data among the image data having different light intensity distributions by:
moving the grid to a predetermined position and temporarily stopping the grid at the predetermined position;
executing imaging multiple times during a predetermined period to obtain the image data including image data of the striped pattern that stops and image data of the striped pattern that is moving, the predetermined period including at least a stop period of the grid and including part of a moving period of the grid prior to the stop period and/or part of a moving period of the grid after the stop period; and
summing up or averaging results of the imaging with regard to each pixel.

2. The three-dimensional measurement device according to claim 1, wherein the predetermined period has a length equal to or shorter than a length of one moving period of the grid.

3. The three-dimensional measurement device according to claim 2, wherein the predetermined striped pattern is a striped pattern having a light intensity distribution in a non-sinusoidal waveform.

4. The three-dimensional measurement device according to claim 3, wherein the grid includes light transmitting portions and light shielding portions that are alternately arranged.

5. The three-dimensional measurement device according to claim 4, wherein the measurement object is a printed circuit board having a surface on which solder paste is printed.

6. The three-dimensional measurement device according to claim 3, wherein the measurement object is a printed circuit board having a surface on which solder paste is printed.

7. The three-dimensional measurement device according to claim 2, wherein the grid includes light transmitting portions and light shielding portions that are alternately arranged.

8. The three-dimensional measurement device according to claim 7, wherein the measurement object is a printed circuit board having a surface on which solder paste is printed.

9. The three-dimensional measurement device according to claim 2, wherein the measurement object is a printed circuit board having a surface on which solder paste is printed.

10. The three-dimensional measurement device according to claim 1, wherein the predetermined striped pattern is a striped pattern having a light intensity distribution in a non-sinusoidal waveform.

11. The three-dimensional measurement device according to claim 10, wherein the grid includes light transmitting portions and light shielding portions that are alternately arranged.

12. The three-dimensional measurement device according to claim 11, wherein the measurement object is a printed circuit board having a surface on which solder paste is printed.

13. The three-dimensional measurement device according to claim 10, wherein the measurement object is a printed circuit board having a surface on which solder paste is printed.

14. The three-dimensional measurement device according to claim 1, wherein the grid includes light transmitting portions and light shielding portions that are alternately arranged.

15. The three-dimensional measurement device according to claim 14, wherein the measurement object is a printed circuit board having a surface on which solder paste is printed.

16. The three-dimensional measurement device according to claim 1, wherein the measurement object is a printed circuit board having a surface on which solder paste is printed.

17. The three-dimensional measurement device according to claim 1, wherein the measurement object is a wafer substrate having a surface on which a solder bump is formed.

* * * * *